(12) United States Patent
Hurwitz et al.

(10) Patent No.: US 10,343,131 B1
(45) Date of Patent: *Jul. 9, 2019

(54) HIGH TEMPERATURE, HYDROPHOBIC, FLEXIBLE AEROGEL COMPOSITE AND METHOD OF MAKING SAME

(71) Applicant: The United States of America, as represented by the Administrator of the National Aeronautics and Space Administration, Washington, DC (US)

(72) Inventors: Frances I. Hurwitz, Shaker Heights, OH (US); Haiquan Guo, Avon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 611 days.

This patent is subject to a terminal disclaimer.

(21) Appl. No.: 14/996,914

(22) Filed: Jan. 15, 2016

Related U.S. Application Data

(63) Continuation-in-part of application No. 14/456,043, filed on Aug. 11, 2014.

(60) Provisional application No. 62/104,206, filed on Jan. 16, 2015, provisional application No. 62/236,381, filed on Oct. 2, 2015, provisional application No. 61/711,372, filed on Aug. 16, 2013, provisional application No. 61/907,662, filed on Nov. 22, 2013.

(51) Int. Cl.
*B01J 13/00* (2006.01)
*C09K 5/00* (2006.01)

(52) U.S. Cl.
CPC ............ *B01J 13/0091* (2013.01); *C09K 5/00* (2013.01)

(58) Field of Classification Search
CPC ........................... C04B 35/80; B01J 13/0091
See application file for complete search history.

(56) References Cited

U.S. PATENT DOCUMENTS

| | | | |
|---|---|---|---|
| 5,221,578 A * | 6/1993 | Carpenter | ............... C04B 35/80 428/367 |
| 5,306,555 A | 4/1994 | Ramamurthi et al. | |
| 5,722,482 A | 3/1998 | Buckley | |
| 5,973,015 A | 10/1999 | Coronado et al. | |
| 6,068,882 A | 5/2000 | Ryu | |

(Continued)

*Primary Examiner* — Matthew J Daniels
(74) *Attorney, Agent, or Firm* — Robert H. Earp, III; William M. Johnson

(57) ABSTRACT

Aerogels, aerogel composites and methods of making the same are discussed. One example method can include the act of creating a Boehmite colloid and adding a hydrolyzed silicon precursor to form a sol. A reinforcement can be infused with the sol, gelled to form a gel, then dried to form an aerogel composite. Such a method can also include the acts of performing one or more solvent exchanges and subjecting the gel composite to supercritical drying. Additionally, such a method can include the act of heat treating the aerogel composite. The aerogel composite can be used in high temperature, flexible seals capable of withstanding temperatures, pressures, and compression levels associated with aerodynamic heating generated during flight and in aerospace applications. The aeorogel composite also can be used in thermal protection systems designed for fire protection for structures or in personnel fire protective equipment.

14 Claims, 23 Drawing Sheets

(56) References Cited

U.S. PATENT DOCUMENTS

| | | | |
|---|---|---|---|
| 6,087,407 | A | 7/2000 | Coronado et al. |
| 6,479,416 | B1 | 11/2002 | Frank et al. |
| 7,504,346 | B2 | 3/2009 | Stepanian et al. |
| 8,021,583 | B2 | 9/2011 | Rouanet et al. |
| 8,039,099 | B1 | 10/2011 | Sullivan |
| 8,214,980 | B2 | 7/2012 | Bullock et al. |
| 2002/0094426 | A1 | 7/2002 | Stepanian et al. |
| 2003/0003284 | A1 | 1/2003 | Schwertfeger et al. |
| 2003/0077438 | A1 | 4/2003 | Frank et al. |
| 2003/0215640 | A1 | 11/2003 | Ackerman et al. |
| 2006/0240216 | A1 | 10/2006 | Stepanian et al. |
| 2007/0173157 | A1 | 7/2007 | Trifu et al. |
| 2011/0206925 | A1* | 8/2011 | Kissel .................. C09D 7/62 428/319.1 |
| 2011/0290365 | A1 | 12/2011 | Rosenberg |
| 2012/0238174 | A1 | 9/2012 | Bullock et al. |
| 2012/0308369 | A1 | 12/2012 | Maheshwari et al. |
| 2013/0022769 | A1 | 1/2013 | Sabri et al. |
| 2013/0071640 | A1 | 3/2013 | Szillat |

* cited by examiner

| Ceramic Reinforcement | Thickness (mm) | Density (g/cc) | Upper Use Temperature | Composition (%) |
|---|---|---|---|---|
| APA-2 Paper | 1.25 | 0.11 | 1650° C | 86 $Al_2O_3$, 10 $SiO_2$, 4 other oxides |
| Fiberfrax 972AH | 0.8 | 0.192 | 1176° C | 47-52 $Al_2O_3$, 48-53 $SiO_2$, <0.5 $Na_2O_3$, <0.5 $Fe_2O_3$ |
| Astroquartz (503 plain weave) Unsized | 0.11 | 2.2 | 1070° C | 99.99 $SiO_2$ |
| Saffil Paper | 0.5, 1.0 | 0.5-0.7 | 1600° C | 95-97 $Al_2O_3$, 3.0-5.0 $SiO_2$, <0.5 trace elements |

| Precursor powder | 2theta (deg) | d (020)(Å) | b (meas.) | b (PDF) | crystallite size | |
|---|---|---|---|---|---|---|
| P2 | 14.074 | 6.287 | 12.575 | 12.240 | 4.9+/-0.2nm | |
| P2W | 14.094 | 6.279 | 12.558 | 12.227 | 2.6+/-0.1nm | |
| T25 | 14.168 | 6.246 | 12.492 | 12.227 | 6.9+/- 0.1 nm | |
| L4 | 14.393 | 6.149 | 12.297 | 12.214 | 13.0 +/-0.1nm | 48.1 +/- 0.9nm La(OH)$_3$ |
| X0 | 14.400 | 6.146 | 12.292 | 12.232 | 11.7+/-0.1nm | |

FIG. 6

HIGH TEMPERATURE, HYDROPHOBIC, FLEXIBLE AEROGEL COMPOSITE AND METHOD OF MAKING SAME

CROSS-REFERENCE TO RELATED APPLICATIONS

This application claims the benefit of U.S. Provisional Patent application Ser. No. 62/104,206 entitled Fabrication of High Temperature Aerogel Insulation Incorporating Fiber Reinforcement Coated with Microporous Radiation Opacifier filed Jan. 16, 2015 and U.S. Provisional Patent application Ser. No. 62/236,381 entitled Hydrophobic Alumina and Aluminosilicate Aerogels and Their Composites filed Oct. 2, 2015 and is a Continuation-in-Part of U.S. patent application Ser. No. 14/456,043 entitled High Temperature, Flexible Aerogel Composite ad Method of Making Same filed Aug. 11, 2014, which claims the benefit of U.S. Provisional Patent application Ser. No. 61/711,372 entitled High Temperature, Flexible Composite Seals for Aeronautics and Space Environments Incorporating Aerogel Insulation filed Aug. 16, 2013 and U.S. Provisional Patent application Ser. No. 61/907,662 entitled Method for Fabricating Aerogel Paper, Felt or Fabric Reinforced Composites filed Nov. 22, 2013. The entireties of the above-noted applications are incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Aerogels are porous solids with high surface areas that are made by forming a gel network and removing the solvent without causing pore collapse. Due to characteristics such as high surface area, high porosity, and low density, these lightweight aerogels are attractive for use as thermal insulators, low dielectric substrates and catalyst supports.

In general, a typical silica aerogel used as insulation loses its high surface area pore structure above about 700° C. As the pore structure of the silica aerogel sinters, thermal conductivity increases, diminishing the insulating capabilities of the aerogel and limiting its upper use temperature. Additionally, commercially available fibrous insulation incorporating silica aerogel exhibits poor adhesion of the aerogel to the fiber reinforcement, resulting in loss of aerogel particles in handling and contributing to a loss of insulating capability.

Traditional seals for high temperature applications, such as thermoelectric power generation and aerospace applications, incorporate a woven ceramic fabric wrapped around a non-woven, blanket type ceramic insulation. These non-woven thermal blanket type insulations are highly non-uniform in fiber density and spacing, and do not provide as low a thermal conductivity as has been demonstrated for high temperature aerogel composites. Conventional blanket insulation is compressible and the thermal characteristics of the blanket are altered by the degree of compression.

There is a need for insulation that can be used at temperatures between 600-1200° C. Although existing blanket insulations may be used at these temperatures, it is desirable to replace existing blanket insulation with higher efficiency, lighter weight materials.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a method of producing an aerogel composite. One example method can include the act of creating an alumina colloid and adding a hydrolyzed silicon precursor to the colloid to create a sol. One or more reinforcements can be infused with the sol which then is converted to a gel to form a gel composite. Such a method can also include the acts of performing one or more solvent exchanges and subjecting the gel composite to supercritical drying to an aerogel composite. Additionally, such a method can include the act of heat treating the aerogel composite.

In another aspect, the subject innovation can include one or more aerogel composites. One such example aerogel composite can include a microporous solid phase product of a sol-gel including an alumina colloid and a hydrolyzed silicon precursor and a reinforcement.

In another aspect, the subject innovation can include a high temperature flexible seal including one or more layers of an aerogel composite, such that the gas permeability of the seal containing the aerogel composite is reduced relative to a seal with the same configuration without such aerogel composite . . . . In one embodiment, the aerogel composite layers can be wrapped in a jelly roll configuration having inner layers including an aerogel composite and an outer layer of an abrasion resistant fabric.

In yet another aspect, the disclosed aerogels, and aerogel composites, are based on alumina, aluminosilicates and/or titania systems and can maintain a high surface area pore structure to temperatures up to about 1200° C. In aspects, the aerogel can be incorporated into reinforcing substrates, such as ceramic papers, felts or fabrics, with good bonding between the aerogel and the fibers, such that flaking or spalling of the aerogel particles is minimized or prevented.

In still yet another aspect, a method is disclosed that includes creating a sol by dispersion of an alumina powder in a solvent to form a colloid; infusing one or more reinforcements with the sol and allowing the reinforcement-infused sol to gel from an acid solution to form a gel composite; performing one or more solvent exchanges on the gel composite; submersing the gel composite in a organosilane or organosilane/solvent mixture so as to incorporate organosilane groups on a surface of the gel composite; and subjecting the gel composite to supercritical drying to form a hydrophobic aerogel composite.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 6 is a table summarizing the properties of Boehmite precursors studied in connection with experiments discussed herein.

DETAILED DESCRIPTION

Figure 1:
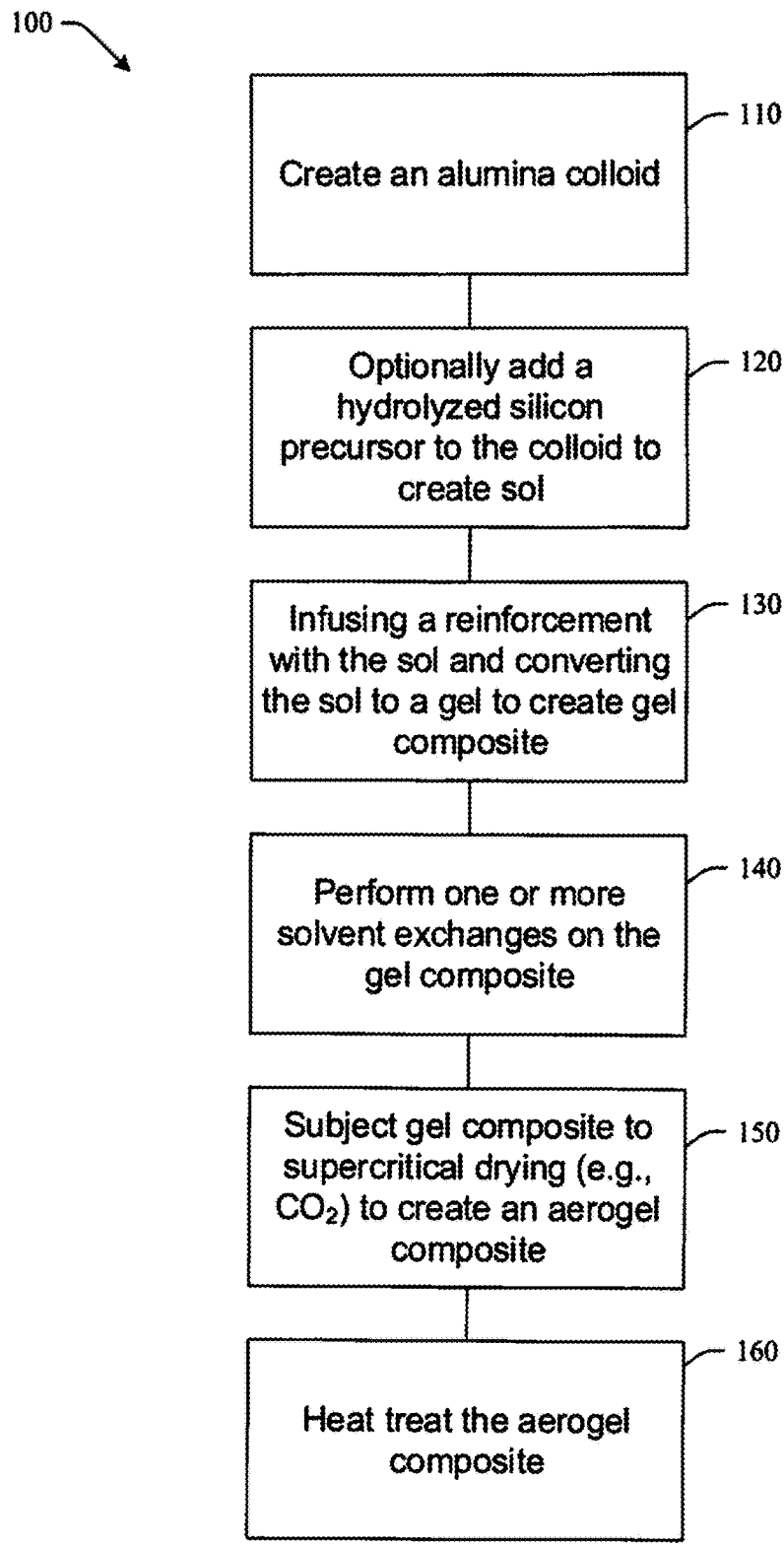
FIG. 1 illustrates a method of fabricating an aerogel composite in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In various aspects, the subject innovation can include aerogels, and aerogel composites, based on alumina, aluminosilicates and/or titania systems that maintain a high surface area pore structure up to temperatures of about 1200° C. The aerogels can be incorporated into a reinforcing substrate, for example, ceramic papers, felts or fabrics. Bonding between the aerogel and the reinforcements can prevent or minimize flaking or spalling of the aerogel particles.

The subject innovation can include an aerogel composite and methods of making the same via depositing an aerogel within a reinforcement that includes, for example, silicon carbide, alumina, silica, mullite and combinations thereof.

The subject innovation can include a high temperature, flexible seal comprising an aerogel composite capable of withstanding temperatures, pressures, compression levels, and exposure durations due to intense aerodynamic heating generated during flight and in aerospace applications.

In an embodiment, a high temperature, flexible seal suitable for aerospace applications includes layers of aerogel infused reinforcements wrapped in a jelly roll fashion. The jelly roll structure can include an outer covering including an abrasion resistant fabric such that the aerogel is protected from abrasion in application. The jelly roll can be secured by most any technique sufficient to hold the structure together, for example, the jelly roll may be stitched or quilted.

In application, the jelly roll structure forms a seal that can be placed in a channel between mating surfaces to protect from intrusion of atmospheres or heat flow. The use of aerogel composite layers in the seal decreases the thermal conductivity of the seal relative to traditional seals using non-woven ceramic blanket materials.

The high temperature, flexible aerogel composite in accordance with various embodiments of the subject innovation can have application as seals or insulation, for example, in space environments or aeronautics. The high temperature, flexible aerogel seals can withstand the rigors of space and interplanetary missions, including exposure to atomic oxygen, ultraviolet radiation, thermal cycling, and abrasion.

Conventional non-woven thermal blanket type insulations are non-uniform in fiber density and spacing, and do not provide as low a thermal conductivity as has been demonstrated for high temperature aerogel composites. Commercial insulating materials which incorporate aerogels typically use silica as the aerogel material, however, the pore structure of silica aerogels begins to collapse and sinter at temperatures above 700° C., limiting the upper use temperature of blanket type insulations.

The subject innovation includes aerogels, aerogel composites and aerogel insulations based on, for example, alumina, aluminosilicates and/or titania systems that can maintain a high surface area pore structure to temperatures up to 1200° C. The aerogels can be incorporated into reinforcing ceramic papers, felts or fabrics, with good bonding between the aerogel and the fibers, such that the aerogel particles are not abraded in use.

A reinforcement, for example, a ceramic fabric, felt or paper material, can be impregnated with a sol and then dried to form an aerogel. The reinforcement can include high temperature ceramic fibers. The aerogel precursor sol can act to bond the particles to the fiber as an inherent part of the gelation process. The fiber reinforcement, or substrate, then undergoes the aerogel drying process as part of the composite.

In an embodiment, an aerogel composite according to the present disclosure can be laid on top of a ceramic fabric such as silicon carbide, alumina, or a combination of silica, alumina or mullite and wrapped in a jelly roll fashion such that the aerogel is protected from abrasion by the fabric in application. A woven ceramic fabric is capable of withstanding rubbing between adjacent parts or surfaces and can protect a more fragile aerogel composite.

The jelly roll can be secured, for example, by quilting or stitching or needling with high temperature thread. The seal can be placed in a channel between mating surfaces to protect from intrusion of atmospheres or heat flow. The use of aerogel layers in a seal can decrease the thermal conductivity of the seal relative to state-of the art seals using non-woven ceramic blanket materials.

In other embodiments, the disclosed aerogel composite can serve as one or more layers in a seal comprised of an outer, abrasion resistant woven fabric, a series of insulating layers stacked with the highest temperature capable insulators toward the hottest side of the seal, and graded to lower temperature capable insulating materials. Insulators may include ceramic fabrics, battings, felts or papers or monolithic aerogels or polymers, for example, on the cooler side of the seal.

In further embodiments, the disclosed aerogel composite can serve as a separator between metallic sheets or foils as part of a multilayer insulation. The multilayer insulation may include the use of radiation opacifiers incorporated within the aerogel and/or as separate layers.

Typical non-woven thermal blanket type insulations are non-uniform in fiber density and spacing, and do not provide as low a thermal conductivity as has been demonstrated for high temperature aerogel composites. Commercial insulating materials which incorporate aerogels generally use silica as the aerogel material, however, the pore structure of silica aerogels begins to collapse and sinter at temperatures above 700° C., making them unsuitable for higher temperature applications.

In an embodiment, a flexible, compressible seal incorporates an aerogel composite that provides improved thermal insulation as compared with existing seals for aeronautic and space applications. In an embodiment, the disclosed seal improves the thermal insulating capability of state of the art seal designs utilizing non-woven ceramic insulation.

The subject innovation includes a method for fabricating low density, flexible aerogel composites for use as thermal insulation for a fiber/aerogel system in which the aerogel is well-bonded to the fibers of a substrate. The bonding of the aerogel to the fibers of a reinforcement greatly reduces flaking and loss of aerogel particles compared with commercially available aerogel insulations. The disclosed aerogel composite insulation can provide very low thermal conductivity, for example, less than 60 mW/m·K at 900° C. in argon, based upon a three point measurement via the three point method of Gembarovic and Taylor, *Int. J. Thermophys.* (2007) 28:2164-2175, the entirety of which is incorporated herein by reference. The disclosed aerogel composite insulation exhibits very low density, typically 0.15 gm/cm$^3$ when the reinforcement is an alumina paper, or as low as 0.07 g/cm$^3$ when the reinforcement is a quartz felt, and can be used at temperatures of greater than 1200° C. The density of the disclosed aerogel composite can be ⅓ that of start-of-the-art insulation materials for space applications.

Commercially available fibrous insulations using silica aerogel exhibit poor adhesion of the aerogel to the fiber reinforcement, resulting in loss of aerogel particles in handling. These materials show large variation in properties, including variation in insulation thickness, and many are rated for use only to temperatures below 400° C., and, in other cases, below 650° C.

Referring initially to the drawings, FIG. 1 illustrates a method 100 of fabricating an aerogel composite in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 100 can begin at 110, by creating a colloid of alumina. For example, a Boehmite powder can be suspended in a water or acid solution. The Boehmite suspension can be sonicated to break up any aggregates.

Optionally, in one embodiment, at 120, a hydrolyzed silicon precursor added to the Boehmite colloid to create a sol. As one example, a silicon precursor can include tetraethyl orthosilicate (TEOS) hydrolyzed in an alcohol solution using a nitric acid catalyst. The hydrolyzed TEOS can be combined with the colloidal Boehmite suspension and magnetically stirred.

In further embodiments, the addition of an opacifier at step 120 can reduce heat transfer due to radiation when the aerogel composite is used as an insulator. For example, a colloidal suspension of $TiO_2$ or $ZrO_2$ can be added to the hydrolyzed TEOS solution at step 120. It was found that higher levels of $TiO_2$ incorporation can be attained by incorporating colloidal $TiO_2$ rather than a liquid Ti precursor such as titanium isopropoxide as a reactant in the sol-gel synthesis. Use of $TiO_2$ isopropoxide has been found to increase viscosity and decrease gel time, and can be limited to <10 mole percent in the Boehmite derived aluminosilicate system. The use of colloidal $TiO_2$ also averts the impurities found in commercial titania powders typically used as opacifiers. Such impurities can lead to grain growth accompanied by densification of the aerogel at 1100° C., whereas aerogels containing colloidal titania maintain their porous structure to beyond 1200° C.

At 130, a layer of reinforcement can be infused with the sol. The reinforcement can include a ceramic paper, felt or fabric. The reinforcement can include silicon carbide, alumina, silica, mullite, zirconia and combinations thereof.

In an embodiment, reinforcements including fabrics, paper or felts without sizing or organic binders are utilized. If a sized fabric is utilized, the sizing can be removed by heat cleaning prior to step 130.

The reinforcement layers can be sufficiently thin so as to yield a flexible composite. A layer of reinforcement can be infused, soaked or impregnated with the sol to create a gel composite.

In aspects, a first layer of reinforcement can be placed in a container and/or on a rigid sheet and a sufficient volume of sol applied so that the reinforcement is submerged. A separator sheet (e.g. a piece of silkscreen) can be placed on top of the sol infused reinforcement. Subsequent layers of reinforcement can be added in the same manner, with additional sol added to cover each layer.

After adding a last layer, a slight compressive force may be applied to the layers to maintain flatness of the reinforcement layers and to prevent the buildup up of excess gel on the reinforcement surface. The sol can be allowed to gel for a period of time, for example 24 hours, at ambient temperature or in a heated oven. In another embodiment, a roller or doctor blade can be used to remove excess sol.

After gel formation, one or more solvent exchanges can be performed at step 140. For example, the gel composite layers can be transferred to a container containing 200 proof ethanol and the separator sheets removed. In an embodiment, the gel composite layers can be aged in a solvent, for example, methanol, ethanol, acetone, or acetonitrile. In aspects, after aging in ethanol from 2 days to several weeks, the layers can be separated and transferred to a supercritical $CO_2$ dryer to exchange the ethanol with liquid $CO_2$.

After removal of the solvent, the gel can be subjected to supercritical drying (e.g., supercritical $CO_2$ extraction, etc.) at 150 to remove the liquid phase and create an aerogel composite. Several soak and vent cycles can be performed, typically 5, to exchange the $CO_2$. A pressure vessel can be heated and the $CO_2$ vented under supercritical conditions.

At step 160, the aerogel composite can be heat treated in air, for example, at 600° C. for 20 minutes to convert the Boehmite phase to $Al_2O_3$ to further reduce the thermal conductivity of the aerogel composite.

In alternate embodiments, the ratios of Al:Si can be varied, or the Si can be omitted to form an all alumina aerogel.

Figure 2:
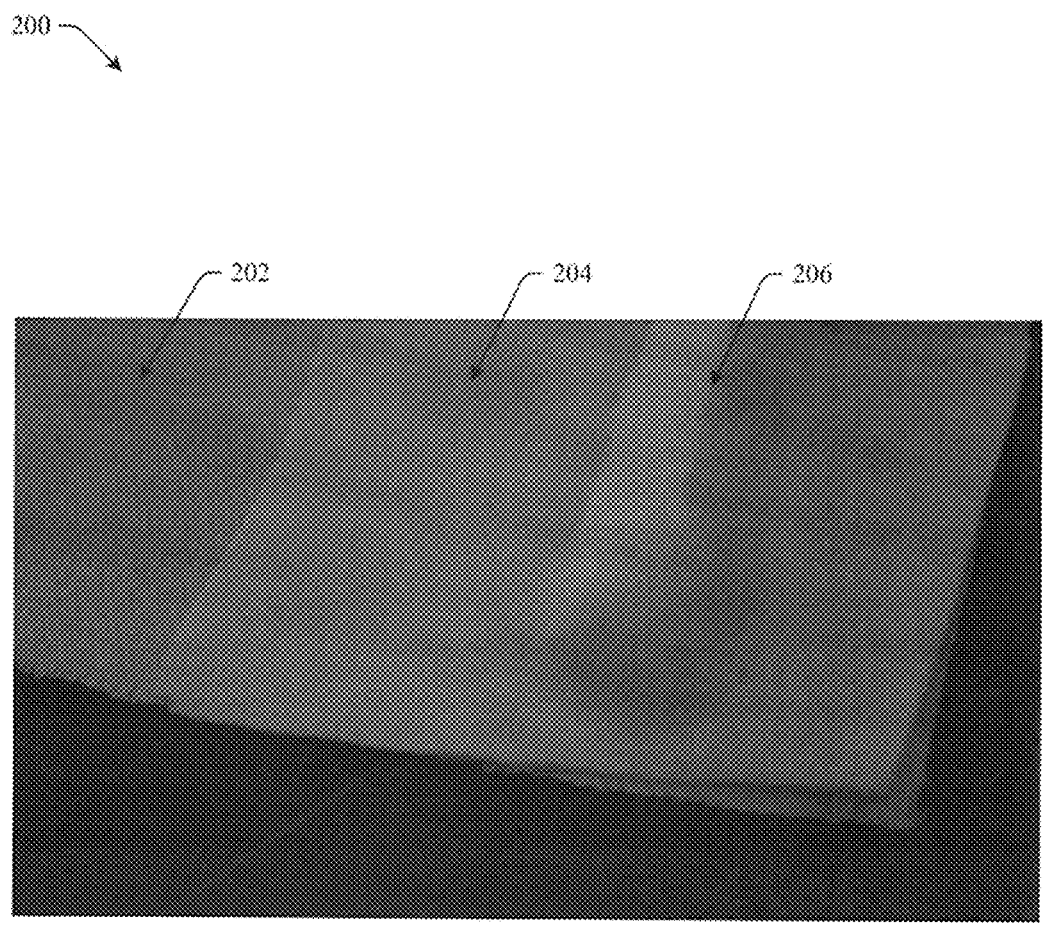
FIG. 2 illustrates a high temperature, flexible seal in accordance with aspects of the subject innovation.

FIG. 2 illustrates layers of an example of a high temperature flexible seal 200 suitable for aerospace applications including an abrasion resistant fabric 202, for example, a woven ceramic fabric, a layer of aerogel infused reinforcement 204 and a blanket or rope insulation 206.

Figure 3:
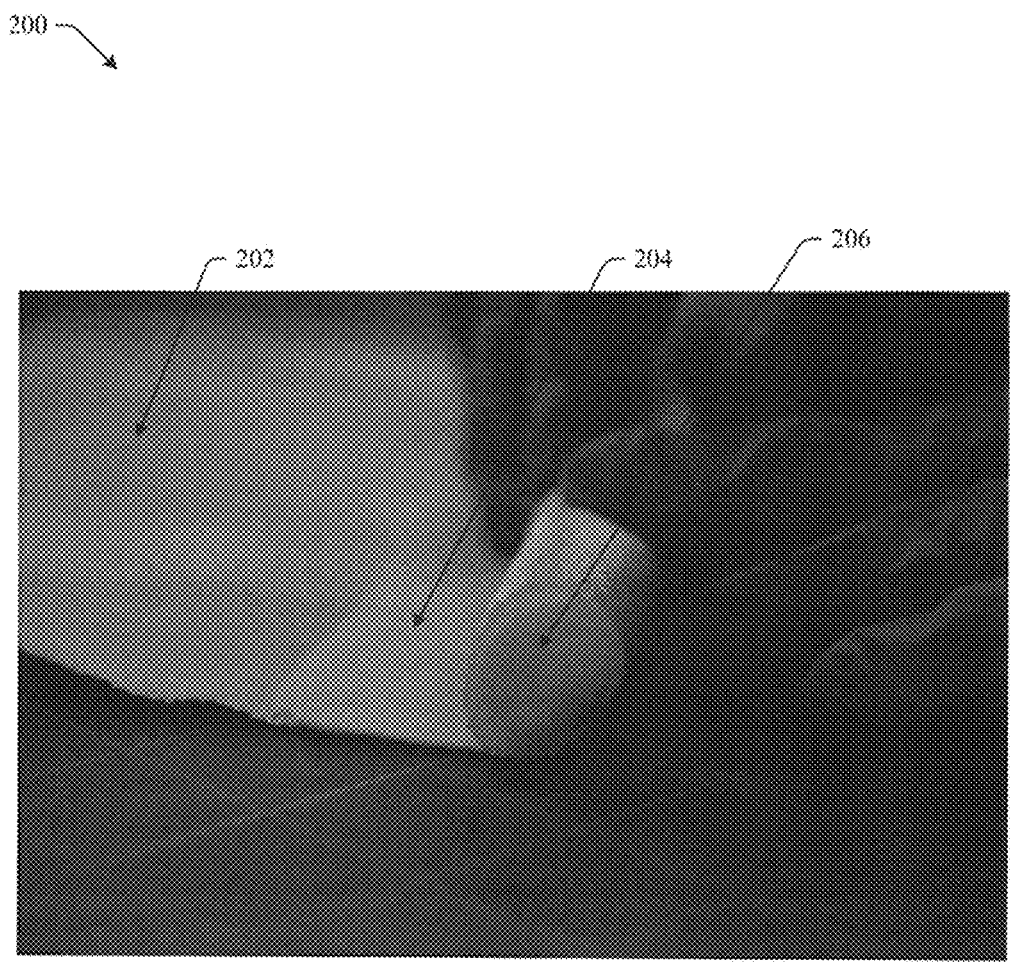
FIG. 3 illustrates a high temperature, flexible seal in accordance with aspects of the subject innovation.

FIG. 3 illustrates layers of an example high temperature flexible seal 200 wrapped in a jelly roll fashion. A layer of abrasion resistant fabric 202 is laid down, then a layer of aerogel infused reinforcement 204 is laid down and a blanket or rope insulation 206 is layered on top. The layers 202, 204, 206 can be rolled up such that the abrasion resistant fabric 202 forms an outer covering that protects the aerogel infused reinforcement 204 from abrasion in application. The jelly roll can be secured by most any technique sufficient to hold the layered and rolled structure together, for example, the jelly roll may be stitched or quilted. In various embodiments, a high temperature flexible seal can include one or more layers of an aerogel composite 204.

In aspects, the aerogel composite layers 204 can be wrapped in a jelly roll configuration around a blanket or rope insulation 206. The inner layers of the jelly roll can include an aerogel composite 204 and an outer layer 202 can include an abrasion resistant 2D fabric or 3D braid.

Figure 4:
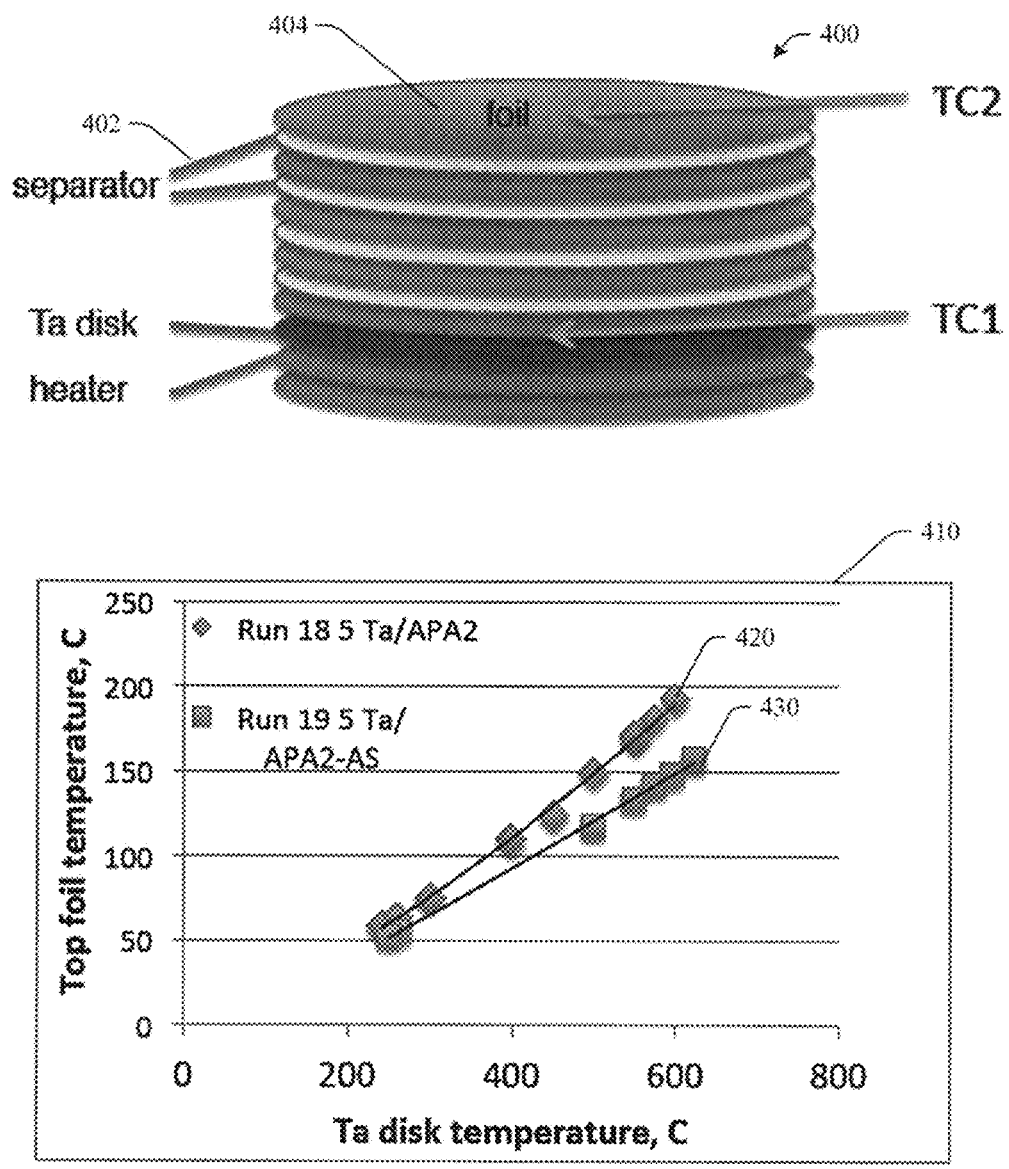
FIG. 4 illustrates a multilayer insulation and a graph of top foil temperature versus Ta disk temperature for an example multilayer insulation in accordance with aspects of the subject innovation, comparing alumina paper separators without aerogel with alumina paper/aerogel composite separators.

FIG. 4 illustrates an example multilayer insulation (MLI) 400 including the disclosed aerogel composite. The disclosed aerogel composite can serve as a separator 402 between metallic sheets or foils 404 as part of a multi-layer insulation 400. A comparison of a multilayer insulation having ceramic paper APA-2/aerogel composite 430 separators with a multilayer insulation having APA-2 ceramic paper 420 alone under stepped heating tests is shown in table 410. Test results revealed that aluminosilicate aerogel reduces heat transfer. For example, the temperature of the $5^{th}$ Ta foil is nominally 40° C. less at a disk temperature of 600° C. when the APA-2 paper is impregnated with the aerogel 430.

Still referring to FIG. 4, the impregnation of APA alumina paper with aerogel reduced thermal conductivity in argon at 900° C. from 100 mW/m·K to 59 mW/m·K. Seven layers of composite material of 1.25 mm/layer produced a temperature drop of 700° C. when tested in the 8'HTT wind tunnel, 17 W/cm2 flux; 1435 psi @3300·R combustor pressure. The porous aerogel structure survived the wind tunnel test. When tested as a foil separator in multilayer insulation (MLI) 400, the disclosed aerogel composite outperformed a baseline zirconia spacer. The multilayer insulation (MLI) 400 may include the use of radiation opacifiers, either incorporated within the aerogel or as separate layers.

Figure 5:
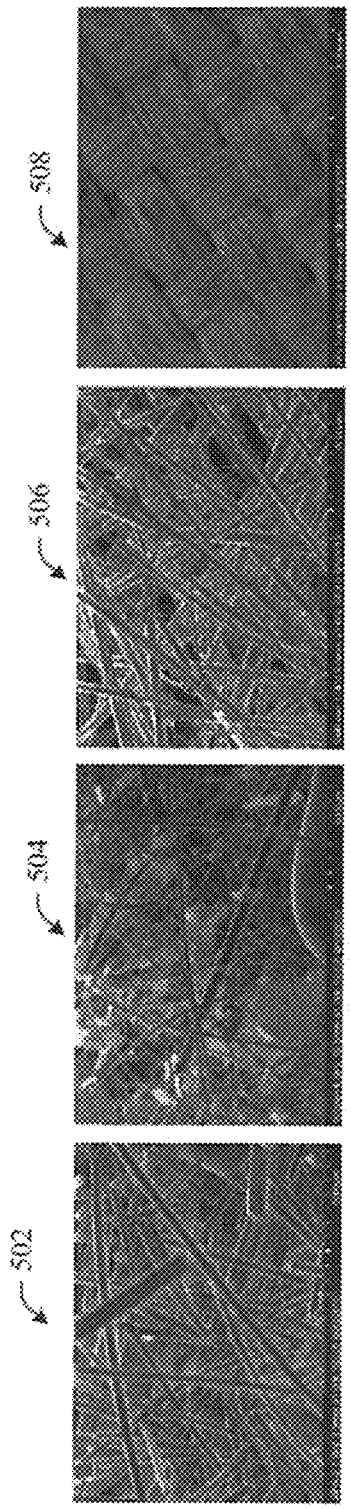
FIG. 5 illustrates various reinforcements, and a table summarizing their properties, in accordance with aspects of the subject innovation

FIG. 5 illustrates various reinforcements, and a table summarizing their properties, in accordance with aspects of the subject innovation. Reinforcements can include fabric, felt or paper, for example, APA-2 ceramic fabric 502, Fiberfrax® 972AH 504, Astroquartz® (503 plain weave) unsized 506, and Saffil® paper 508.

What follows is a more detailed discussion of certain compositions, articles, methods, materials, and apparatuses associated with aspects of the subject innovation. To aid in the understanding of aspects of the subject innovation, theoretical analysis and experimental results associated with specific experiments that were conducted are discussed herein.

However, although for the purposes of obtaining the results discussed herein, specific choices were made as to the selection of various aspects of the experiments and associated setups, such as choice of materials (e.g., selection of alumina, silica, solvent(s), relative concentration, etc.), the compositions, articles, and methods described herein can be employed in other contexts, as well. For example, various aspects of the subject innovation can be utilized to produce aerogels for a variety of uses. In some embodiments, different selections of materials or formulation parameters can be selected than those used in the experiments discussed herein, and may have differing characteristics, as explained in greater detail below.

Of the materials used in experiments discussed herein, the Boehmite powders were donated by Sasol North America. TEOS was purchased from Sigma-Aldrich (St. Louis, Mo.). Reagent grade nitric acid was purchased from Fisher Scientific.

Super-critically dried aerogels were characterized by physical measurement to determine shrinkage and physical density. Pore size distribution as well as nitrogen adsorption/desorption were used to determine surface area. Chemical bonding structure of starting powders and aerogels were characterized by Fourier transform infrared spectroscopy (FTIR) using KBr pellets.

Solid state Al Direct Polarization (DP) and $^1H$-$^{29}Si$ Cross-Polarization (CP) NMR spectra were acquired using a nuclear magnetic resonance spectrometer. Field emission scanning electron microscopy (FESEM) was performed on uncoated samples using low accelerating voltage (typically 1 kV) to characterize pore morphology.

Thermal analysis of the aerogels was conducted using simultaneous thermogravimetric analysis (TGA) and differential thermal analysis (DTA) in helium to identify mass loss and phase transitions. X-ray diffraction analysis (XRD), obtained from Cu Kα radiation, was used to characterize both starting Boehmite powders and aerogels, and to correlate phases in heat-treated samples with DTA transitions. Multiple regression techniques were employed for data analysis using statistical software.

Alumina and aluminosilicates aerogels offer potential for use at temperatures above 700° C., where silica aerogels begin to sinter. Stability of alumina and aluminosilicates pore structures at high temperatures can be governed by the starting aerogel structure, which, in turn can be controlled by the synthesis route.

Experiments were conducted and the structure, morphology and crystallization behavior was compared for aerogels synthesized from $AlCl_3$ and propylene oxide with those synthesized from a variety of Boehmite precursors.

The aerogels possessing a crystalline Boehmite structure in the as-synthesized condition retained mesoporous structures to temperatures of 1200° C., while the $AlCl_3$-derived aerogels, although exhibiting higher as-synthesized surface areas, crystallized and densified at 980-1005° C.

Alumina and aluminosilicates aerogels are of interest as constituents of thermal insulation systems with potential for use at temperatures higher than those attainable with silica aerogels, which densify and sinter at temperatures above 600-700° C. Addition of alumina, in combination with silica, has been shown to delay sintering to higher temperatures, with increases in sintering temperature achieved using as little as 0.01 mole % $Al_2O_3$ (from Boehmite) added to silica on a nanoscale.

The nanostructure of the aerogel varies based on the synthesis route, including choice of precursors, solvent, water/precursor ratio, dilution, pH and use of templating agents. In aluminosilicates aerogels, the extent of aluminum incorporation is also shown to vary with the precursor route. The experiments focus on synthesizing alumina and aluminosilicates aerogels using two precursor routes: (1) $AlCl_3$ and propylene oxide (PO) or (2) a colloidal route using several Boehmite starting powders. In both routes, tetraethoxysilane (TEOS) was used as the silicon source.

The experiments based on synthesizing aerogels using $AlCl_3$ and propylene oxide (PO) focused on two Al/Si mole ratios: 8Al:1Si, anticipated to produce an aluminum-rich composition, or 3Al:1Si, close to stoichiometric mullite. Two levels of solids loading were investigated: Al+Si equal to 48 mmol (designated as low solids) or 72 mmol (high solids).

$AlCl_3$ was dissolved in a solution of alcohol (absolute ethanol) and water at either a "high water" (17.4 ml water in 38 ml alcohol) or "low water" (6.4 ml water in 38 ml alcohol) level. The solution was heated for 30 minutes to dissolve all the $AlCl_3$ powder, and then cooled to room temperature. TEOS was added, and the solution stirred for 60 minutes. The solution was chilled in a bath of ice water prior to the addition of propylene oxide to extend gelation times.

Propylene oxide was transferred by syringe through a septum, so as to reduce laboratory personnel exposure. Propylene oxide is listed by the U.S. Environmental Protection Agency as a group B2 possible human carcinogen (EPA Bulletin 75-96-9, April 1992, revised January 2000.) After slow addition of propylene oxide, the solution was stirred very briefly (1-2 minutes) to mix, then poured into molds and covered with parafilm. Gelation typically occurred in 10-30 minutes.

The gels were aged at ambient temperature for 24 hours before being extracted into absolute ethanol. The gels were washed by exchange of ethanol after an additional 24 hours, and aged in ethanol for 3-31 days before being super-critically dried using carbon dioxide.

In another series of experiments, Boehmite derived aerogels were synthesized utilizing several Boehmite [AlOOH] powders designated as P2, P2 W, L4 and T25. In a preliminary study, use of soluble precursors has been shown to favor gel networks with significant Al—O—Si tetrahedral bonding, while the colloidal approach primarily maintains the $AlO_6$ octahedral structure characteristic of Boehmite.

FIG. 6 is a table summarizing the properties of the different Boehmite precursors studied in connection with experiments discussed herein.

Figure 7:
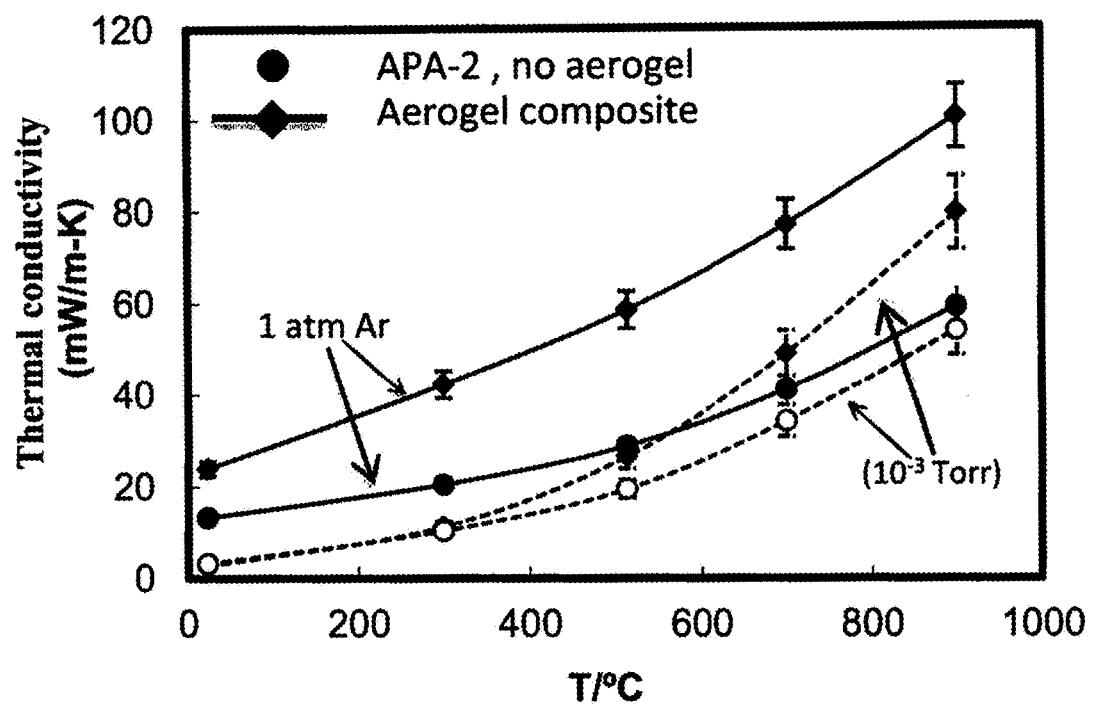
FIG. 7 illustrates a graph of thermal conductivity versus temperature in connection with an alumina paper having no aerogel composite and an aerogel composite in accordance with aspects of the subject innovation.

FIG. 7 illustrates a graph of thermal conductivity versus temperature in connection with an APA-2 alumina paper made principally of alumina fiber having no aerogel composite and an aerogel composite in accordance with aspects of the subject innovation.

Aluminosilicate aerogels were prepared at Al:Si ratios of 8Al:1Si and 3Al:1Si. The Boehmite powders were dispersed in 0.09M nitric acid solution or in water, and sonicated using an ultrasonic processor for 2 minutes at 60 percent amplitude for batch sizes of 15 ml. TEOS was hydrolyzed with a stoichiometric amount of water using a nitric acid catalyst in 200 proof ethanol, and the mixture was vigorously stirred. TEOS was hydrolyzed separately for 60 minutes in 38 ml of an absolute ethanol solution containing 4 mmol water/mmol TEOS, and 0.625 ml of a 0.13M nitric acid solution.

The TEOS solution was added slowly to the Boehmite dispersion, and stirred for an additional 15 minutes. The combined sol was poured into polyethylene molds and held at either ambient temperature or 55° C. for 24 hours, following which the hydrogels were extracted into 200 proof ethanol, and then super-critically dried using carbon dioxide.

The aerogels were placed into high purity alumina boats and heated in a tube furnace under an atmosphere of flowing argon. Temperatures were ramped at a rate of 5° C./min to final temperatures of 600, 1000, 1100, 1200 or 1300° C., and held at the temperature for 18 minutes. The furnace was then allowed to cool to room temperature under continued argon flow. Additional samples were heated at 600, 1000 1100 and 1200° C. for periods up to 24 hours. In an additional experiment aerogels were heated to 1100° C. and held at that temperature for 96 hours.

Boehmite derived aerogels exhibited lower physical density (0.050-0.075 gm/cm$^3$) than those synthesized using $AlCl_3$/TEOS/PO. Shrinkages also were much lower, ranging from slight swelling to 5.3% linear shrinkage. Unlike the $AlCl_3$/TEOS/PO gels, shrinkage was not increased by aging prior to super-critical drying. The Boehmite derived aerogels also were more fragile on handling. Surface areas were considerably lower than those of the $AlCl_3$/TEOS/PO aerogels, and ranged from 150-465 m$^2$/g.

Figure 8:
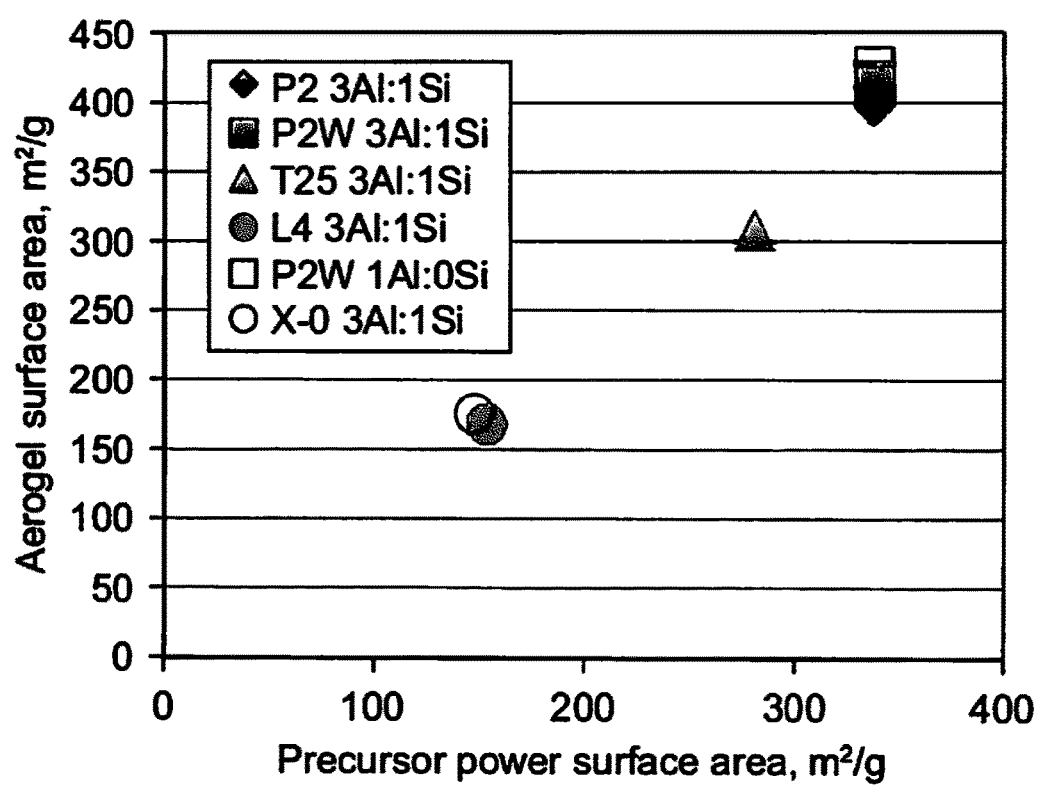
FIG. 8 illustrates a graph of aerogel surface area versus precursor powder surface area studied in connection with experiments discussed herein.

In FIG. 8, the surface areas of the starting powders and those of corresponding aerogels are plotted. Aerogel surface area and morphology differed with that of the starting precursor Boehmite powder. The crystallographic properties of the starting powders are shown in FIG. 6. Smaller crystallite size and higher surface area powders gave rise to higher surface area aerogels. Surface areas >400 m$^2$/g were attained using the smallest crystallite size P2 and P2 W powders, with no significant difference between the two.

Figure 9:
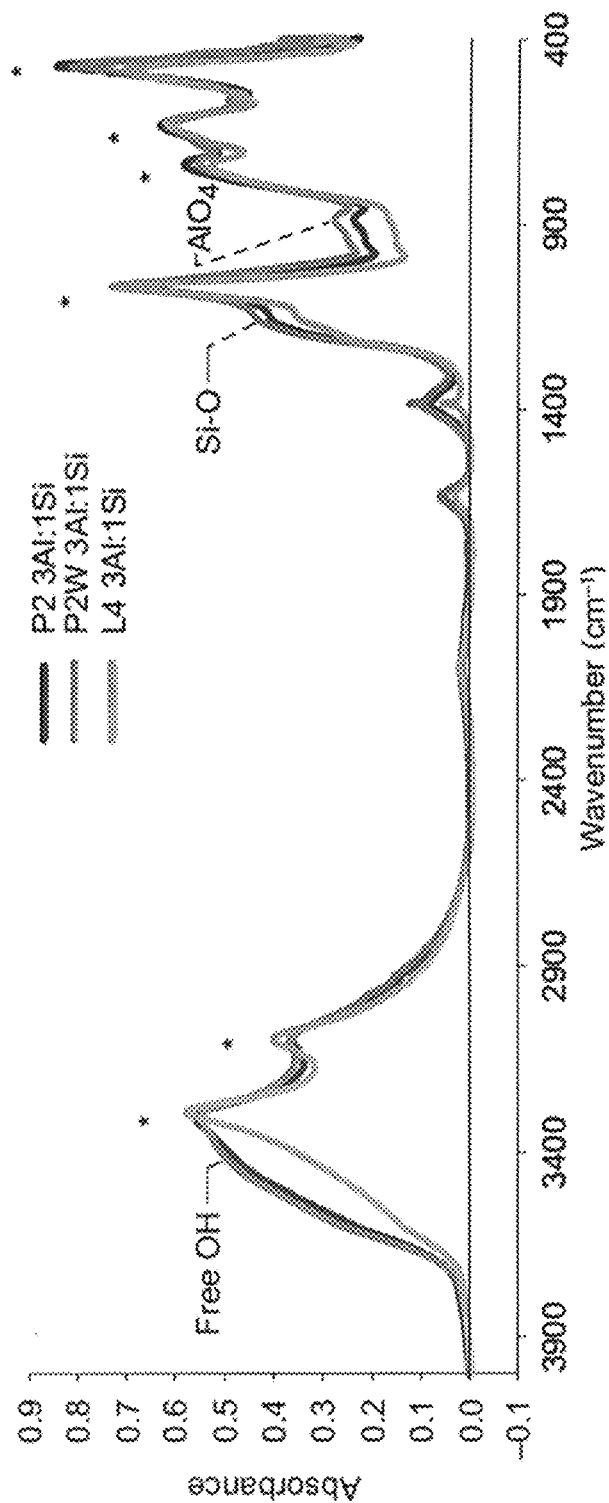
FIG. 9 illustrates FTIR spectra of Boehmite derived aerogels studied in connection with experiments discussed herein.

FIG. 9 shows Fourier transform infrared spectra of the Boehmite derived aerogels from three different starting Boehmite powders. FIG. 9 demonstrates that the aerogel structure reflects that of Boehmite (γ-AlOOH), retaining the peaks that are characteristic of the starting powders at 3284 and 3089 (Al—OH), 1068, 736, 630 and 474 cm$^{-1}$. The asterisks denote peaks that are characteristic of the starting powders.

In the Boehmite-derived aluminosilicates, aerogels additional peaks are observed at 1126 (SiO$_4$) and 1010 cm$^{-1}$ (likely arising from AlO$_4$ or Si—O—Al). The spectra would support a gel backbone structure based on an assembly of Boehmite crystallites.

Figure 10:
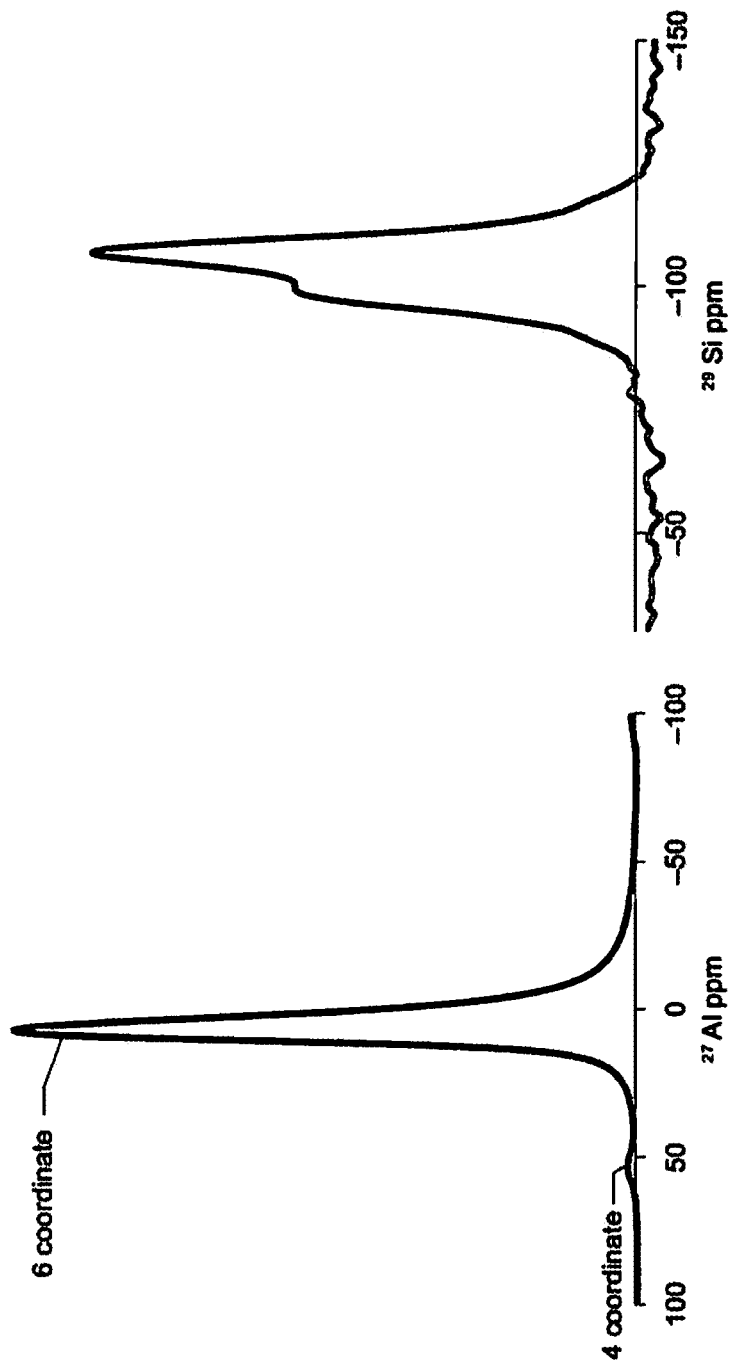
FIG. 10 illustrates solid state $^{27}$Al and $^{29}$Si NMR spectra of a Boehmite derived aerogel of the subject innovation illustrating the formation of 4-coordinate Al with incorporation of Si in the aerogel.

The $^{27}$Al and $^{29}$Si NMR spectra of 3Al:1Si Boehmite aerogels illustrated in FIG. 10 provide further support for the self-assembly of Boehmite crystallites. The $^{27}$Al spectrum demonstrates a dominant 6 coordinate alumina peak at 7 ppm, with only a very small 4 coordinate alumina peak at 57 ppm. The ratio of AlO$_4$ to AlO$_6$ is considerably less than that in the AlCl$_3$/TEOS/PO gels. The $^{29}$Si NMR spectrum is characterized by a peak at −106 ppm with a shoulder at −98 ppm, showing a very different Si environment than that of the AlCl$_3$/PO gels and consistent with an interpretation of a diphasic gel.

The peak at −106 ppm is consistent with Si(O—Si)$_4$ tetrahedra, while the peak at −98 ppm is consistent with the presence of Si—O—Al bonds in an Si(O—Al)(O—Si)$_3$ configuration. The finding supports a structure based primarily on the assembly of Boehmite crystallites with Si—O—Al groups formed at the edges.

DTA analysis of the Boehmite derived aerogels shows an exotherm centered near 405° C., and corresponds with a phase change from γ-AlOOH to γ/η-Al$_2$O$_3$, as confirmed by XRD. This phase transformation is accompanied by the loss of water corresponding with a nominally 15-16% mass loss. No DTA peaks were observed in the 500-1000° C. temperature range.

Figure 11A:
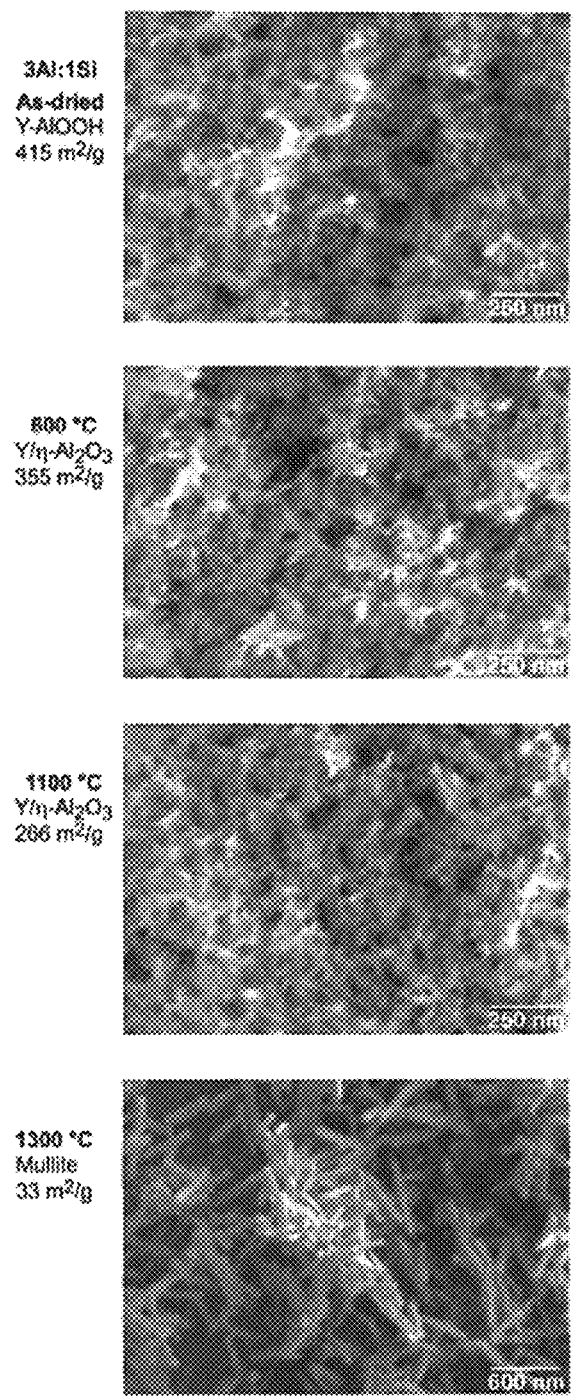
FIGS. 11A and 11B illustrates phase changes and changes in morphology with heat treatment for a Boehmite derived aluminosilicate aerogel of the subject innovation.
Figure 11B:
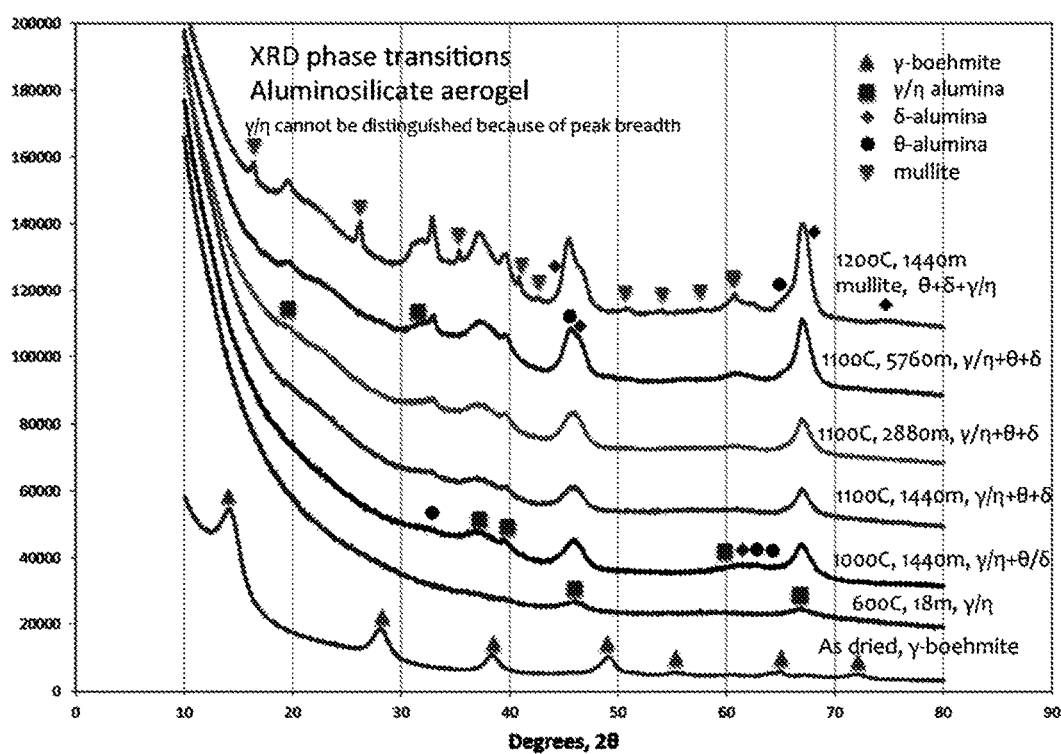

FIGS. 11A and 11B illustrate phase changes and changes in morphology with heat treatment for a Boehmite derived 3Al:1Si aerogel synthesized using a P2 W Boehmite powder. In the aluminosilicate aerogel the γ/η-alumina phase established by 600° C. persists at 1100° C. and 1200° C. By 1300° C., the sample has densified to form mullite rods.

Figure 12A:
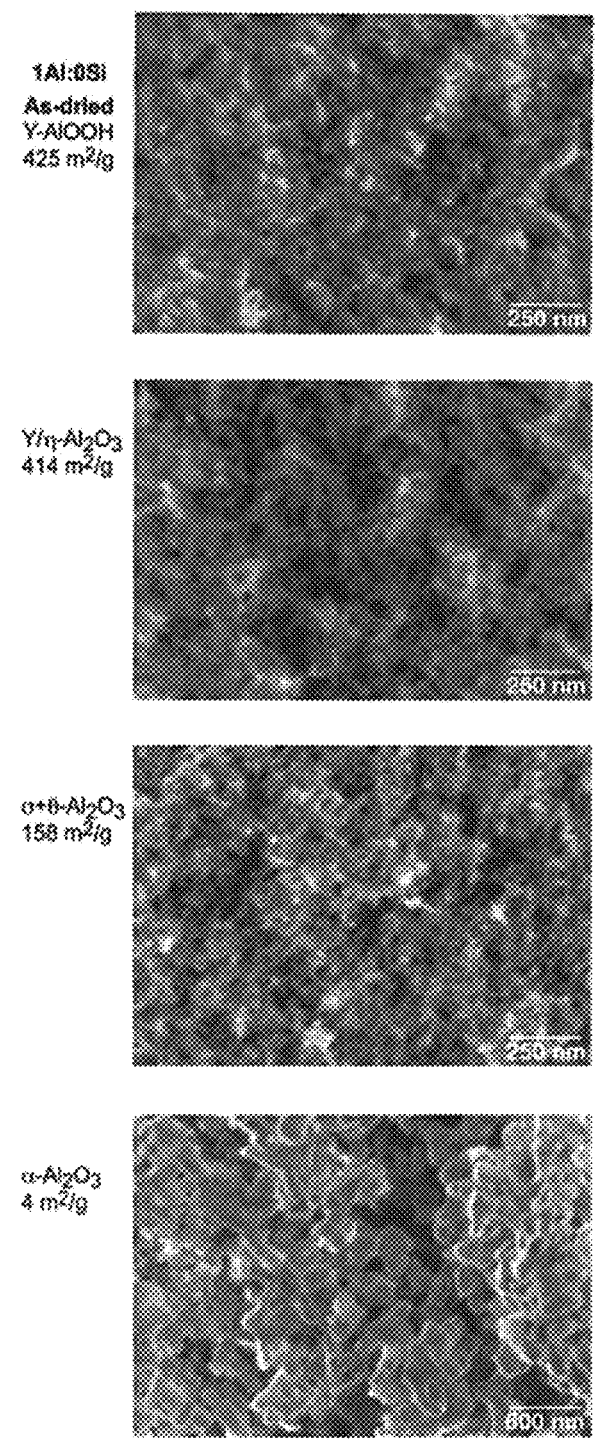
FIGS. 12A and 12B illustrates phase changes and changes in morphology with heat treatment for all alumina aerogels of the subject innovation.
Figure 12B:
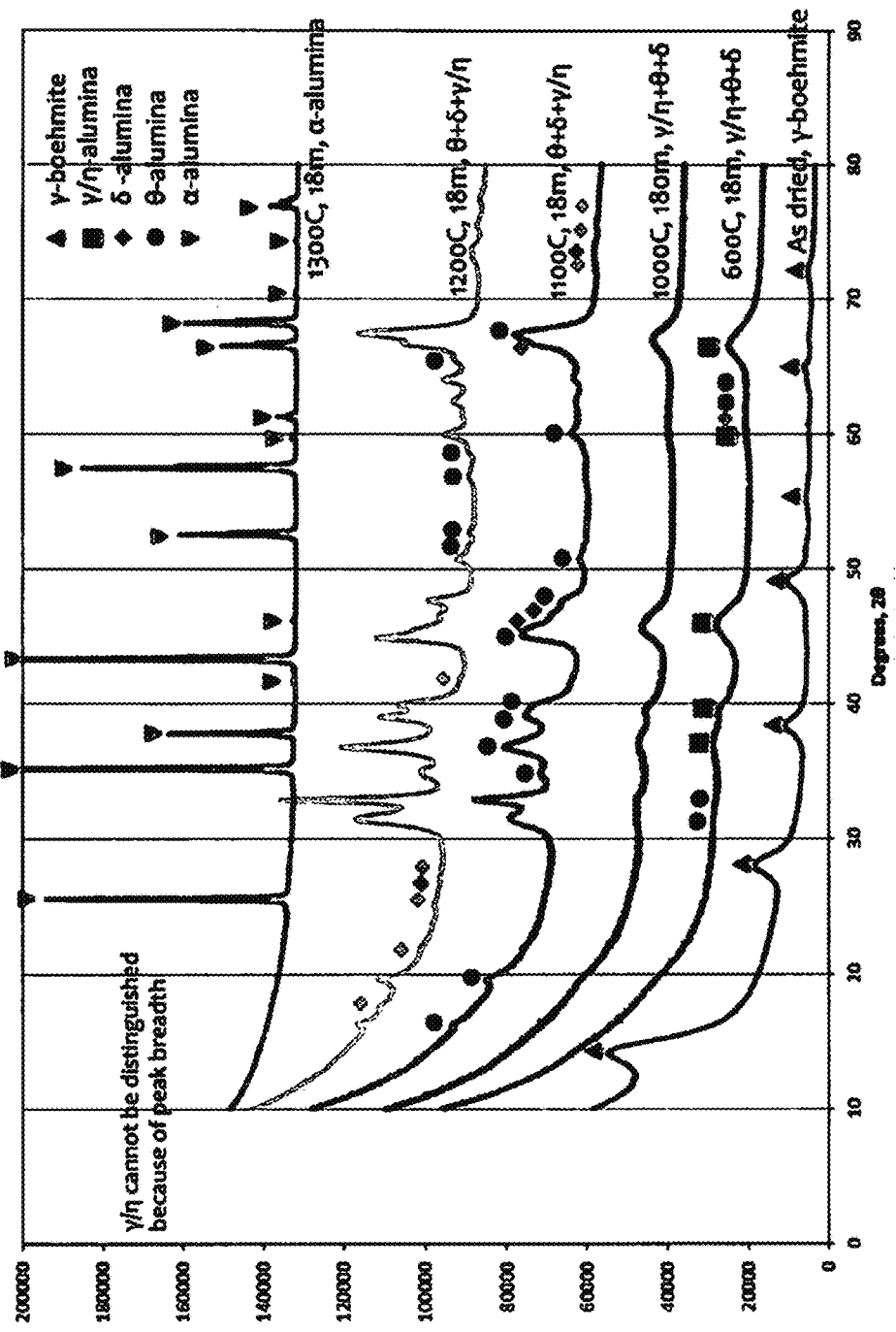

FIGS. 12A and 12B illustrate phase changes and changes in morphology with heat treatment for a P2 W all alumina (1Al:0Si) aerogel. In the case of the all alumina aerogel, the super-critically dried sample starts out with a surface area similar to that of the aluminosilicates (425 vs. 415 m$^2$/g). It transforms from γ-AlOOH to/η-alumina by 600° C., to δ+θ alumina at 1100° C., and to α-alumina by 1300° C. At 600° C. the surface are of the alumina aerogel is 414 m$^2$/g, while that of the aluminosilicates has decreased to 355 m$^2$/g. However, at 1100° C. the aluminosilicates aerogel still has a surface area of 266 m$^2$/g, while that of the alumina aerogel has decreased to 158 m$^2$/g. By 1300° C., both have densified.

Figure 13:
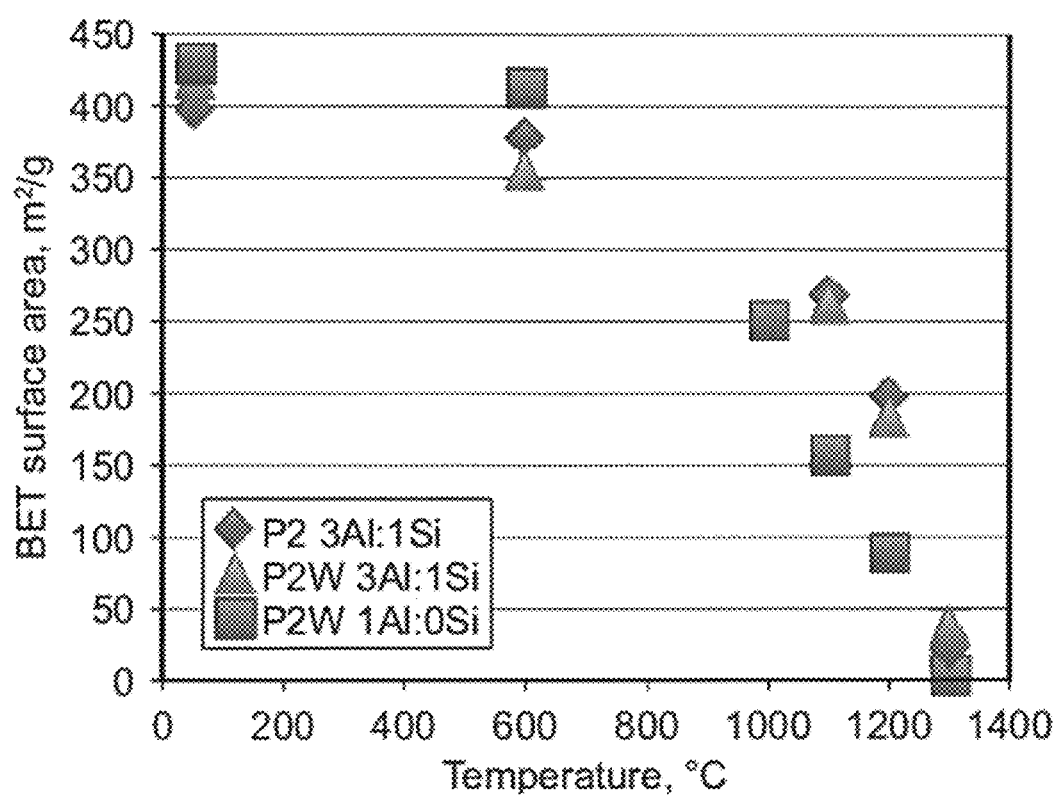
FIG. 13 illustrates a graph of aerogel surface area versus heat treatment temperature of Boehmite derived aerogels of the subject innovation.

FIG. 13 illustrates the change in surface area with temperature for two different 3Al:1Si aluminosilicates aerogels, synthesized from P2 and P2 W, and the all alumina P2 W aerogel plotted as a function of temperature. There is no significant difference in the densification behavior of P2 versus P2 W gels, which maintain a surface area of 266 m$^2$/g at 1100° C. FIG. 13 also demonstrates that the P2 W Boehmite all-alumina aerogels lose surface area about 100° C. earlier than the aluminosilicates. High surface area structures still were present after 60 h at 700° C.

The two approaches to synthesizing aluminosilicates aerogels using the reaction of AlCl$_3$/TEOS/PO or Boehmite/ TEOS produced aerogels with very different surface areas, shrinkages, backbone structures and sintering behavior.

The Boehmite synthesis pathway yielded lower physical density aerogels of nominally 0.06-0.07 g/cm$^3$. The aerogels were stable on aging, offering larger processing windows for achieving consistent properties. Shrinkages were limited to less than 6%. The aerogels appeared to be the products of the self-assembly of Boehmite crystallites, with their pore structure reflecting the particle size of the starting powders.

NMR and FTIR characterization suggested diphasic gels, with some Si—O—Al bonding, likely at the edges of Al—O—Al domains. Most significantly, they avoid crystallization to mullite in the temperature range from 980 to 1005° C. characteristic of monophasic gels. They also are characterized by surface areas of greater than 250 m$^2$/g at 1100° C. Exposures at 700° C. for greater than 60 hours showed the mesoporous morphology was maintained. Because of this higher thermal stability, the Boehmite approach appears to offer a tailorable pore structure suitable for very high temperature applications as catalyst supports or in thermal insulation. It also averts the use of potentially carcinogenic propylene oxide.

In an alternative embodiment illustrated in FIGS. 14A-16, a method of creating a hydrophobic aerogel composite while maintaining an open pore structure to keep the aerogel from collapsing is disclosed in accordance with an aspect of the innovation. The aerogel composite can be made hydrophobic with Boehmite (AIOOH) powders that are used as the aluminum source in preparation of alumina and aluminosilicate aerogels. In aluminosilicate aerogel preparations, tetraethoxysilane (TEOS) or tetramethoxy silane (TMOS) can be used as a silicon source.

Aluminosilicate hydrogels were prepared at Al:Si in ratios, such as but not limited to, approximately 1Al:OSi, 8Al:1Si, and 3Al:1Si. It is to be understood, however, that the Al:Si ratio can be varied from all alumina to all silica. For example, TEOS was hydrolyzed in approximately 38 ml of a 200 proof ethanol solution containing approximately 4 mmol water/mmol TEOS, and approximately 0.625 ml of a 1.2 g nitric acid/100 ml water solution for approximately 60 minutes. The Boehmite powders were dispersed in approximately 15 ml 0.9M nitric acid solution or in water, and sonicated using a Misonix 4000 sonicator with a 419 tip for approximately 2 minutes at approximately 60 percent amplitude. TEOS hydrolyzed solution was added to the Boehmite dispersion, and stirred for approximately an additional 15 minutes. The combined sol was poured into polyethylene molds and held at either ambient temperature or approximately 55° C. for approximately 24 hours, following which the hydrogels were extracted into 200 proof ethanol.

Aluminosilicate hydrogel composites were made by soaking the ceramic papers, felts, or fabric in the aluminosilicate sol prepared as described above. A Misonix 201 sonicator tip might be used to sonicate a batch of up to 250 ml of the Boehmite dispersion for 2 minutes with a 60% amplitude, or a larger tip used for larger batches. Some example ceramic papers, felts or fabrics may include APA-2, ASPA-2, Saffil paper, Fiberfrax 972 AH, Nextel 440, Astroquartz fabrics, Superwool, ALF 50, NMB, lsofrax, lnsulfrax, Quartzel felts, Quartzel papers, etc. In a glass container, the ceramic papers, felts or fabrics were sandwiched in between two Teflon or polyethylene sheets and a solvent permeable silkscreen fabric was used to separate each layer of ceramic materials. A number of weights may be added on the top sheet to provide a compressive force ranging from 0 to 15 g/cm$^2$ to control the thickness of the composite and to squeeze out excess sol. The samples were held at approximately 55° C.

for approximately 24 hours. Then the weights and the polypropylene or Teflon sheets were removed, and the aluminosilicate hydrogel composite were separated and soaked in the 200 proof ethanol.

To make the hydrophobic aluminosilicate aerogels or aluminosilicate aerogel composites, the surface of the aerogels or aerogel composites is modified by coverage of silanes with hydrophobic groups. More specifically, the aluminosilicate hydrogel or aluminosilicate hydrogel composites were soaked (submersed) directly in an organosilane, or organosilane/hexane, organosilane/pentane, or organosilane/cyclohexane mixtures for a predetermined time period of approximately 12 hours so as to incorporate organcilane groups on a surface of the gel composite. The silanes used include, but are not limited to, propyltrimethoxysilane (PTMS), propyitriethoxylsilane (PTES), methyltrimethoxysilane (MTMS), methyltriethoxysilane (MTES), cyclopentryltrimethoxysilane (CPMS), triethoxy(ethyl)silane, phenyltrlethoxysilane (PHTES), and phenyltrimethoxysilane (PHTMS). The organisilanes may condense with unreacted hydroxyl groups on the surface of the alcogel. The monoliths or composites are then supercritically dried using $CO_2$. The resulted samples are hydrophobic but still maintain the similar surface area, density, shrinkage as the samples without surface modification.

The aerogel with hydrophobic treatment heated to approximately 1200° C. under an inert environment shows nominally the same mass loss as a similar aerogel without such hydrophobic treatment. The hydrophobic treatment can alter the Al:Si ratio, and also introduce carbon into the resulting structure, as noted by the development of gray or black aerogels on short term thermal exposure. The carbon may then react with excess silica by carbothermal reduction at temperatures of approximately 1100° C., again producing a "white" material at longer exposure at high temperatures. Varying the organic group varies the carbon incorporation, and influences the formation of cristobalite in materials heated above nominally 1000° C.

Figure 14A:
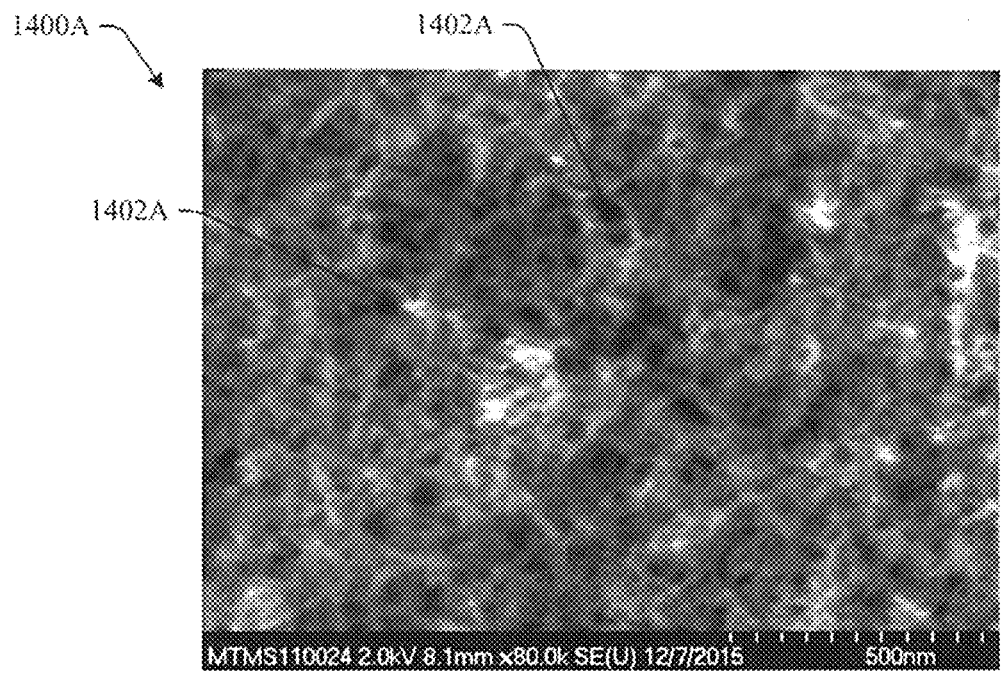
FIGS. 14A and 14B illustrate the aerogel composite treated with a silane to create a hydrophobic aerogel composite in accordance with aspects of the subject innovation.
Figure 14B:
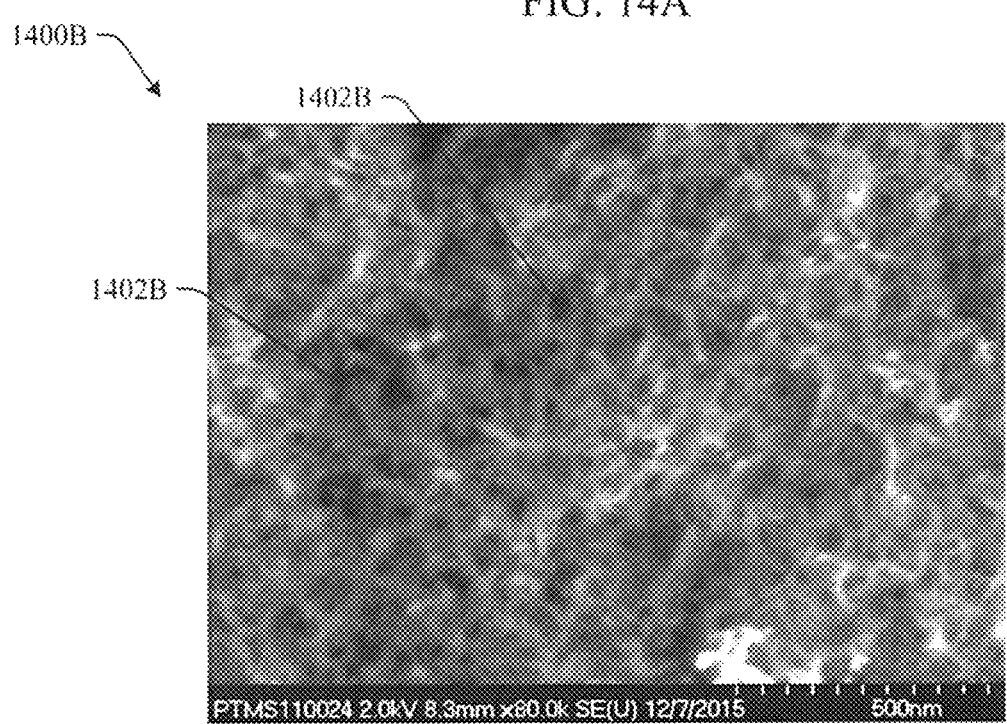
Figure 14C:
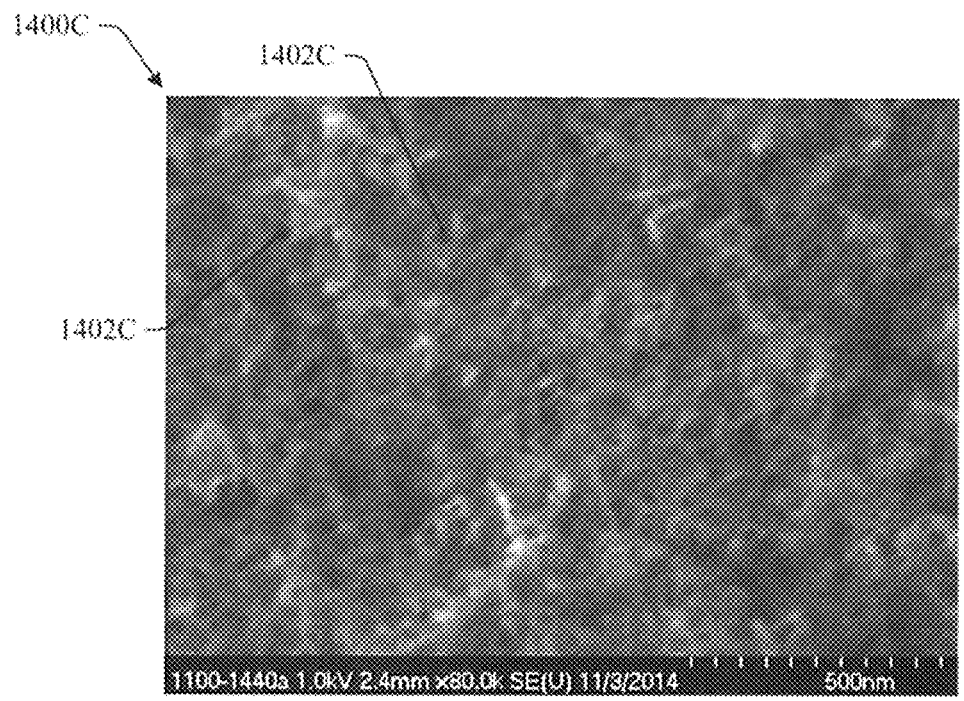
FIGS. 14C and 14D illustrate the aerogel composite not treated with a silane in accordance with aspects of the subject innovation.
Figure 14D:
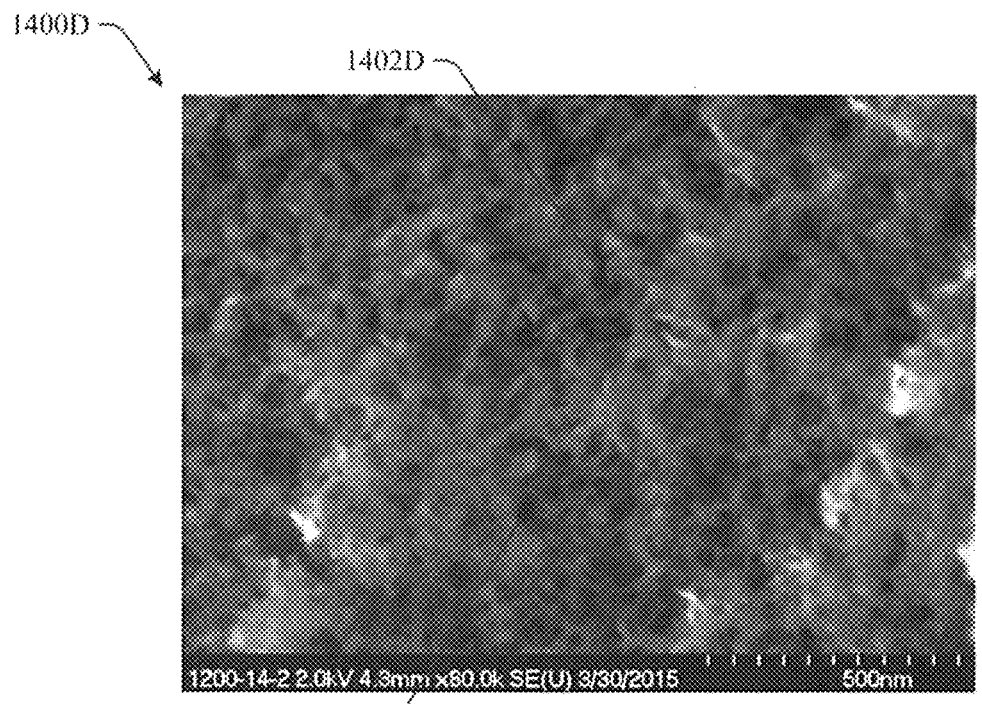

Referring to FIGS. 14A-14D, FIGS. 14A and 14B illustrate hydrophobic aerogel composites micrographs 1400A, 1400B treated with MTMS and PTMS respectively and heated to approximately 1100° C.-1200° C. for approximately 24 hours in an inert gas, such as but not limited to, argon. FIGS. 14C and 14D are non-hydrophobic aerogel composite micrographs 1400C, 1400D heated to approximately 1100° C.-1200° C. for approximately 24 hours in an inert gas, such as but not limited to, argon. As mentioned above, the hydrophobic aerogel composites are created while still maintaining an open pore structure to keep the aerogel composite from collapsing. The hydrophobic aerogel composite micrographs 1400A, 1400B in FIGS. 14A and 14B clearly show the presence of pores 1402A, 1402B even after the composites underwent a heat treatment, as indicated above. Thus, the open pore structure of the aerogel composites remained intact and the aerogel structure did not collapse, which means that the aerogel composites can still function as an insulator. Comparatively, the non-hydrophobic aerogel composite micrographs 1400C, 1400D also show the presence pores 1402C, 1402D after undergoing the same heat treatment. Therefore, soaking the aerogel composites in a silane to create a hydrophobic aerogel composite did not alter the structure of the aerogel composite.

Figure 15A:
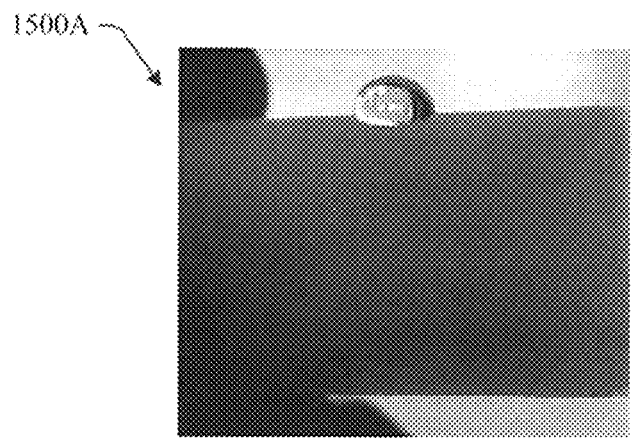
FIGS. 15A, 15B, and 15C illustrate hydrophobic aerogel composites treated with various silanes showing a hydrophobic feature in accordance with aspects of the subject innovation.
Figure 15B:
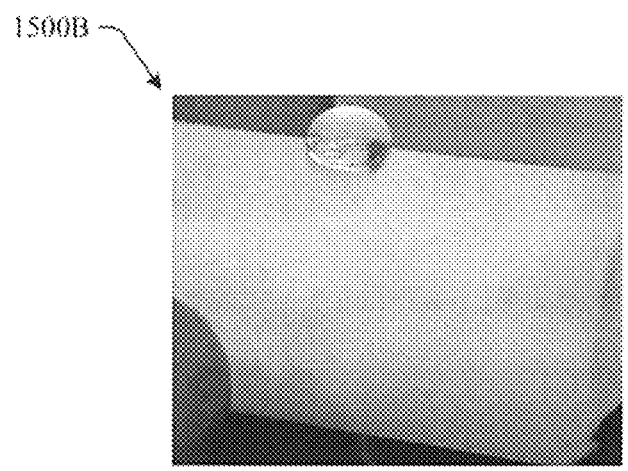
Figure 15C:
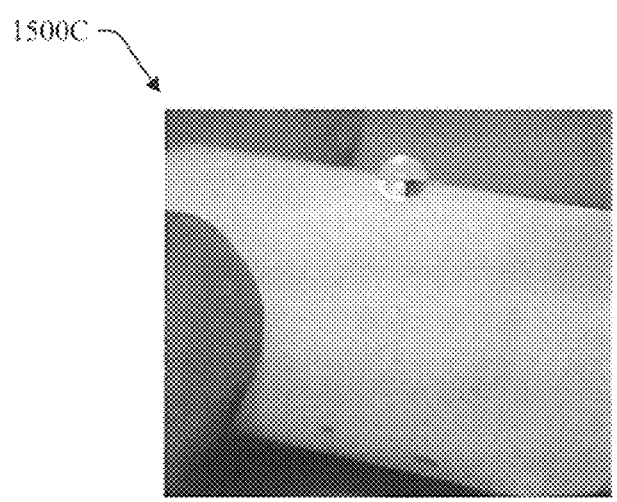

FIGS. 15A, 15B, and 15C illustrate hydrophobic aerogels treated with MTMS 1500A, CPMS 1500B, and PTMS 1500C respectively. The hydrophobic aerogels shown in FIGS. 15A, 15B, and 15C illustrate the hydrophobic (waterproof) feature of the innovation. As clearly illustrated, the liquid (e.g., water) beads up and does not penetrate the aerogel. The less the base of the bead spreads (i.e., the smaller the drop) the more waterproof the hydrophobic aerogel composite. As illustrated, the hydrophobic aerogel shown in FIG. 15C provides a higher contact angle with the bead of water than the aerogels in FIGS. 15A and 15B, as evident by the spread of the bead.

Figure 16:
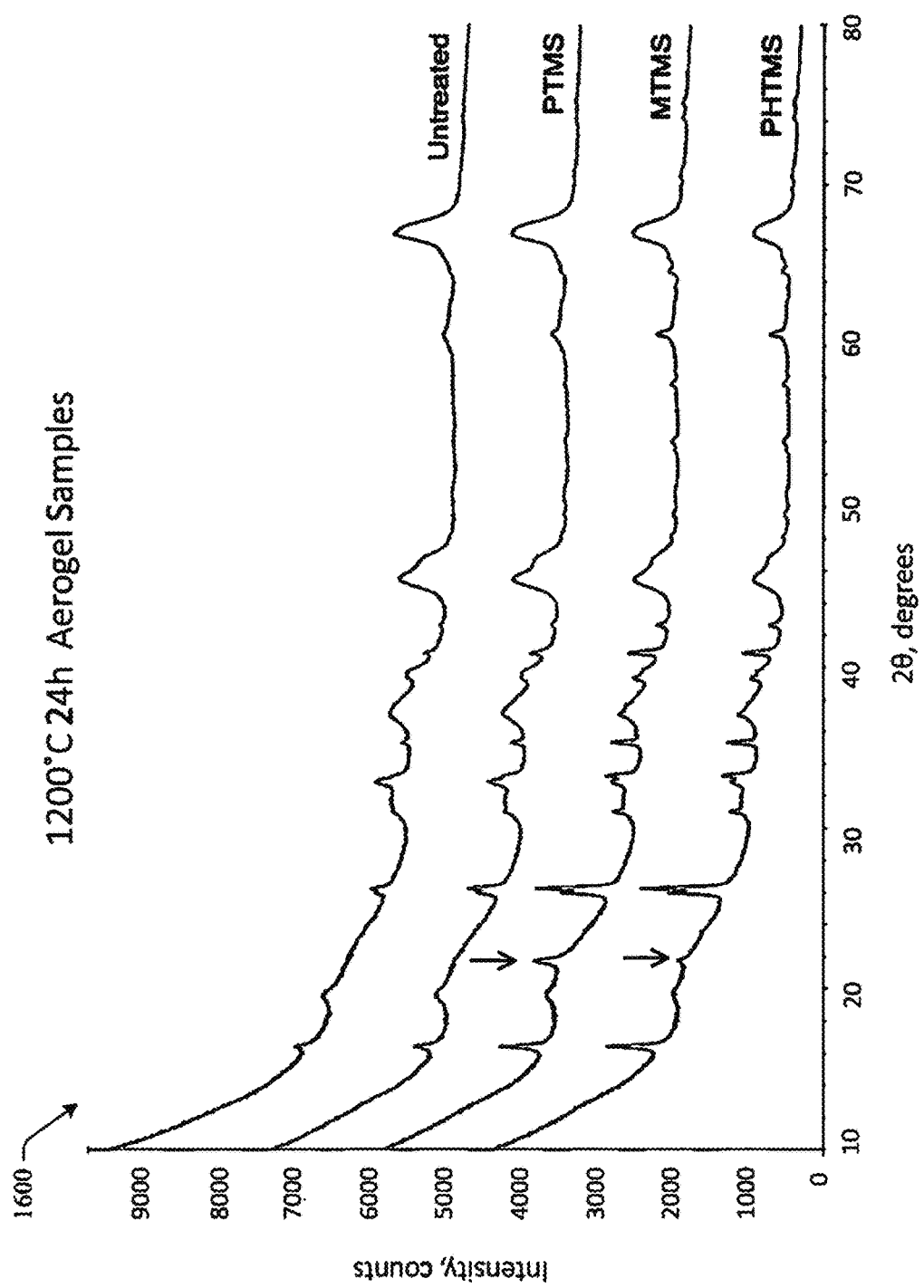
FIG. 16 is an X-ray diffraction graph of hydrophobic aerogels in accordance with aspects of the subject innovation.

FIG. 16 illustrates X-ray diffraction spectra 1600 of hydrophobic aerogels heat treated to 1200° C. for 24 hours. The graph illustrates cristobalite formation (indicated by the arrows) in the MTMS and PHTMS treated aerogels. Cristobalite formation, however, did not appear in the PTMS treated material. In addition, the PTMS treated sample and the untreated sample have nearly the same crystallographic structure.

Other methods have substituted organosilane for at least ⅓ of the TEOS or TMOS silicon precursor. These methods do not work in the alumina and aluminosilicate system even when an organosilane is substituted for all the TEOS, as it still leaves Al—OH groups unprotected.

Still others immerse alumina alcogels in trimethylmethoxysilane TMMS in hexane. The innovation disclosed herein expands this concept to other organosialanes and to a method for producing aerogel composites, and provides a method for producing hydrophobic aerogels and composites which can then be either ambiently or supercritically dried.

Figure 17:
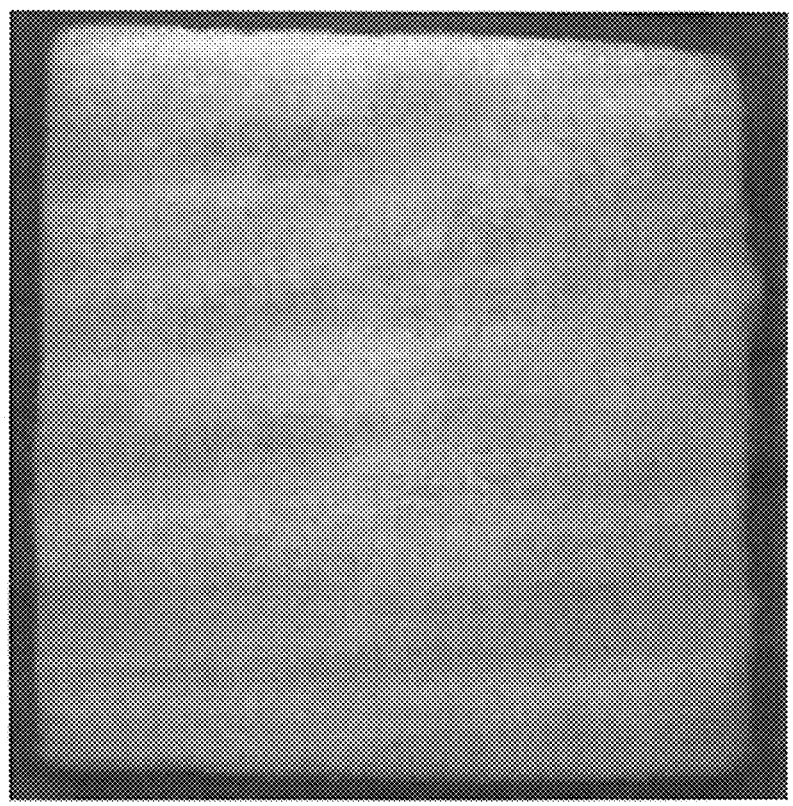
FIG. 17 illustrates a quartz fiber composite impregnated with an aerogel in accordance with aspects of the subject innovation.
Figure 18:
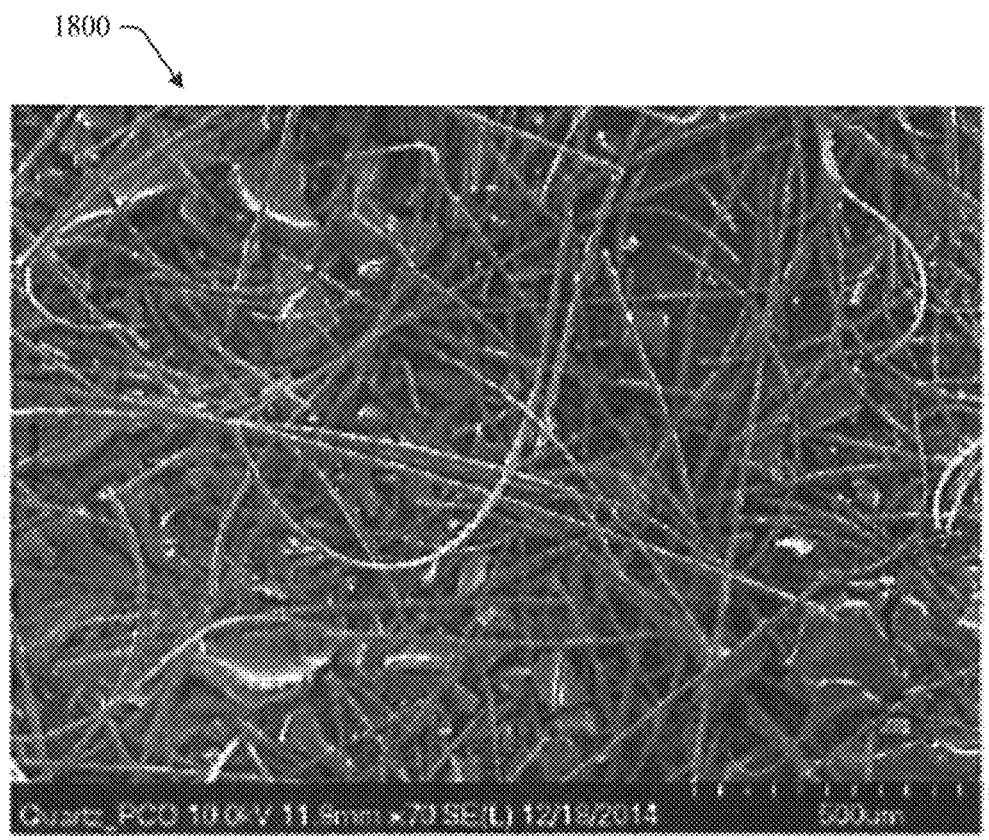
FIG. 18 illustrates a quartz fiber felt coated with a microporous metal oxide coating in accordance with aspects of the subject innovation.
Figure 19:
FIG. 19 is a close view of the quartz fiber in FIG. 18 depicting the coating in accordance with aspects of the subject innovation.

FIGS. 17-20 illustrate an alternate embodiment of an innovative aerogel composite in accordance with an aspect of the innovation. FIG. 17 is an example embodiment of an aerogel composite 1700 utilizing a ceramic fiber (e.g., silicon carbide, alumina, silica (quartz), mullite, zirconia and/or combinations thereof) coated with an opacifier. More specifically, the innovative aerogel composite 1700 utilizes a reinforcing fiber (fibrous reinforcement) coated with an opacifier, which may include a microporous metal or mineral oxide, such as but not limited to, titania, zirconia, silicon carbide, carbon, graphite, etc. that is capable of absorbing radiation in the infrared region. The fiber may be comprised of woven fabric, felt, paper, non-woven blanket, etc. FIG. 18 illustrates an example fibrous reinforcement 1800 coated with the opacifier 1900, which is shown in the close-up view in FIG. 19.

Since thermal conductivity increases with temperature following a $T^4$ relationship, such that as the temperature increases, thermal conductivity becomes radiation dominated. The opacifier coating 1900 of the fibrous reinforcement 1800 creates a higher surface area and a higher mass fraction of opacifier than is achieved by the use of the colloidal suspension or particulate. The opacifier coating 1900 lowers the thermal conductivity of the aerogel composite relative to that of an aerogel composite reinforced by the same fiber without the opacifier coating.

Figure 20:
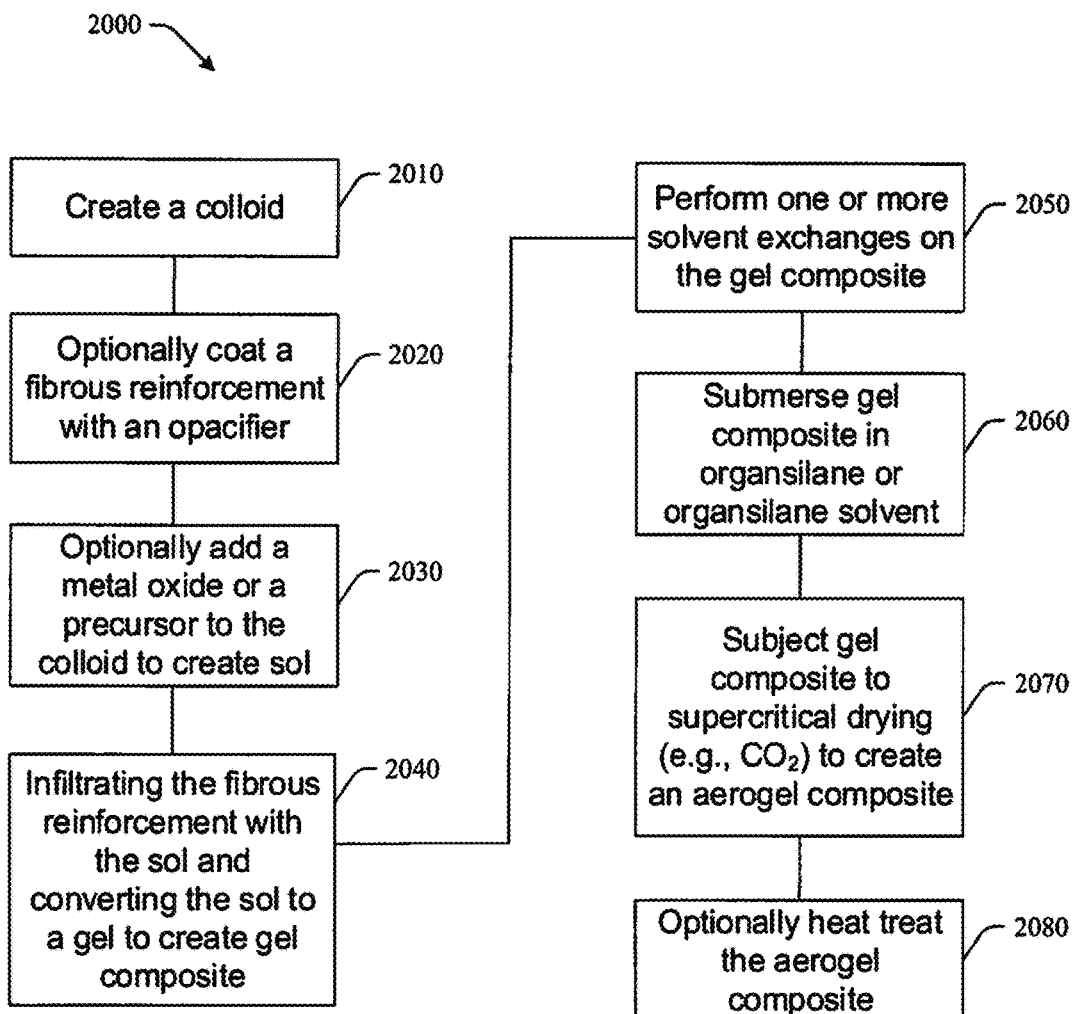
FIG. 20 illustrates a method of fabricating an aerogel composite that includes an opacifier coating in accordance with an aspect of the innovation.

FIG. 20 illustrates a method of fabricating a hydrophobic aerogel composite that may or may not include a fibrous reinforcement coated with an opacifier. At 2010, a colloid is created. Optionally at 2020, the fibrous reinforcement is coated with the opacifier, as described above. Optionally, in one embodiment, at 2030, a metal oxide, such as but not limited to alumina, aluminosilicate, etc. or alternatively, a carbon aerogel precursor sol is added to the colloid to create a sol. At 2040, the coated fibrous reinforcement is infiltrated with the sol to create gel composite. At 2050, one or more solvent exchanges may be performed. For example, the gel composite layers can be transferred to a container containing 200 proof ethanol and the separator sheets removed. In an embodiment, the gel composite layers can be aged in a solvent, for example, methanol, ethanol, acetone, or acetonitrile. In aspects, after aging in ethanol from two days to several weeks, the layers can be separated and transferred to a supercritical $CO_2$ dryer to exchange the ethanol with liquid $CO_2$. At 2060, the gel is submersed in the organosilane or organosilane solvent for a predetermined period of time. At 2070, the gel can be subjected to supercritical drying (e.g., supercritical $CO_2$ extraction, etc.) to remove the liquid phase and create the aerogel composite. Several soak and vent cycles can be performed to exchange the $CO_2$. A pressure vessel can be heated and the $CO_2$ vented under supercritical conditions. Optionally at 2080, the aerogel composite can be heat treated in air, for example, at 600° C. for 20 minutes to further reduce the thermal conductivity of the aerogel composite.

In one example, a silica fiber coated with microporous titania can be impregnated with alumina-silica sol. The sol is gelled with reinforcement, which is then dried using supercritical $CO_2$ to form an aerogel. Alternatively, the gel can be ambiently dried or supercritical dried. In this example, the final composite has a density of 0.07 g/cm³.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
   creating a sol by:
     dispersing an alumina powder in a solution to form a colloid; and
     adding a hydrolyzed silicon precursor to the colloid;
   infusing one or more reinforcements with the sol and allowing the reinforcement-infused sol to gel at an ambient or heated temperature to form a gel composite;
   performing one or more solvent exchanges on the gel composite;
   modifying a surface of the gel composite by submersing the gel composite in an organosilane mixture so as to incorporate organosilane groups on the surface of the gel composite; and
   subjecting the gel composite to supercritical drying to form an aerogel composite.

2. The method of claim 1, wherein the solution includes one of water or an aqueous acid solution.

3. The method of claim 1 further comprising heating the aerogel composite to form θ and/or δ alumina and mullite.

4. The method of claim 1, wherein the addition of silicon is controlled so that the formation of α-alumina can be avoided on heating to 1200° C.

5. The method of claim 1, wherein the alumina powder is a Boehmite powder such that the aerogel composite contains a Boehmite-derived aerogel having a linear shrinkage that is less than or equal to 5.3%.

6. The method of claim 1, further comprising controlling cristobalite formation in hydrophobic aerogels and their composites through choice of an organosilane in the organosilane mixture.

7. The method of claim 1, wherein the aerogel composite is able to maintain a mesoporous structure after heat treatment at 1100° C. for periods of at least 24 hours or at 1200° C. for periods of less than 24 hours.

8. The method of claim 1, wherein prior to infusing one or more reinforcements with the sol and allowing the reinforcement-infused sol to gel to form a gel composite, the method further comprising coating the one or more reinforcements with a radiation opacifier prior to impregnation of the reinforcement with the precursor sol.

9. The method of claim 8, wherein the one or more reinforcements includes a ceramic fibrous reinforcement.

10. The method of claim 8, wherein the radiation opacifier is one of a titania, zirconia, silicon carbide and carbon.

11. The method of claim 8, wherein the radiation opacifier is capable of absorbing radiation in the infrared region.

12. The method of claim 1, wherein the alumina powder is a Boehmite powder, further comprising heating the aerogel composite to convert Boehmite to γ and/or η alumina.

13. The method of claim 1 further comprising heating the aerogel composite to form θ and/or δ alumina.

14. The method of claim 1, wherein the sol is an alumina sol or an aluminosilicate sol, wherein a colloidal or particulate opacifier is dispersed in the alumina or aluminosilicate sol prior to infiltration of the fibrous reinforcement.

\* \* \* \* \*